(12) United States Patent
Yakushigawa et al.

(10) Patent No.: US 6,702,882 B2
(45) Date of Patent: Mar. 9, 2004

(54) INK SET, INK JET RECORDING METHOD, RECORDING UNIT, INK CARTRIDGE AND INK JET RECORDING APPARATUS

(75) Inventors: Yuko Yakushigawa, Kanagawa (JP); Yoshihisa Takizawa, Tokyo (JP); Kumiko Mafune, Kanagawa (JP); Hisashi Teraoka, Kanagawa (JP); Tsuyoshi Kanke, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 09/884,096

(22) Filed: Jun. 20, 2001

(65) Prior Publication Data

US 2002/0018107 A1 Feb. 14, 2002

(30) Foreign Application Priority Data

Jun. 23, 2000 (JP) ........................................ 2000-190325

(51) Int. Cl.$^7$ ............................................... C09D 11/02
(52) U.S. Cl. ................. 106/31.27; 106/31.47; 106/31.48; 106/31.51; 106/31.6
(58) Field of Search ................. 106/31.27, 31.47, 106/31.48, 31.51, 31.6

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 4,313,124 A | 1/1982 | Hara | 346/140 R |
| 4,345,262 A | 8/1982 | Shirato et al. | 346/140 R |
| 4,391,960 A | 7/1983 | Kleine et al. | 526/74 |
| 4,459,600 A | 7/1984 | Sato et al. | 346/140 R |
| 4,463,359 A | 7/1984 | Ayata et al. | 346/1.1 |
| 4,533,920 A | 8/1985 | Suzuki | 346/1.1 |
| 4,558,333 A | 12/1985 | Sugitani et al. | 346/140 R |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,218,376 A | 6/1993 | Asai | 346/1.1 |
| 5,221,497 A | 6/1993 | Watanabe et al. | 252/313.2 |
| 5,451,251 A | 9/1995 | Mafune et al. | 106/31.43 |
| 5,466,282 A | 11/1995 | Eida et al. | 106/31.48 |
| 5,772,742 A | 6/1998 | Wang | 106/31.27 |
| 5,833,743 A | 11/1998 | Elwakil | 106/31.27 |
| 6,454,844 B1 * | 9/2002 | Kanaya | 106/31.48 |
| 6,460,988 B1 * | 10/2002 | Mafune et al. | 347/100 |
| 2002/0038613 A1 * | 4/2002 | Yatake | 106/31.6 |
| 2002/0050225 A1 * | 5/2002 | Mafune et al. | 106/31.27 |
| 2002/0093557 A1 * | 7/2002 | Takuhara et al. | 347/100 |

FOREIGN PATENT DOCUMENTS

| | | |
|---|---|---|
| EP | 0 831 135 A1 | 3/1998 |
| EP | 0 962 324 A1 | 12/1999 |
| EP | 1 164 174 A1 | 12/2001 |
| JP | 54-56847 A | 5/1979 |
| JP | 55-27830 A | 2/1980 |
| JP | 57-44605 A | 3/1982 |

(List continued on next page.)

Primary Examiner—Helene Klemanski
(74) Attorney, Agent, or Firm—Fitzpatrick, Cella, Harper & Scinto

(57) ABSTRACT

An ink set includes inks each containing a colorant and an aqueous medium, wherein in a fading test under conditions that cause fading corresponding to pseudo-indoor sunlight fading through a window for 3 years or more, the difference between respective images' ΔE, the images being produced with the respective inks, is 10 or less in a CIELAB color space display system, and each of the images has a residual ratio of reflection density of 70% or more. By using the ink set including the color inks with which images having substantially the same fading ΔE after long-term storage are produced, the color balance of a recorded image can be maintained after long-term storage.

24 Claims, 17 Drawing Sheets

FOREIGN PATENT DOCUMENTS

| | | |
|---|---|---|
| JP | 59-123670 A | 7/1984 |
| JP | 59-138461 A | 8/1984 |
| JP | 60-71260 A | 4/1985 |
| JP | 2803134 B2 | 12/1989 |
| JP | 2881847 B2 | 10/1990 |
| JP | 2783647 B2 | 1/1992 |
| JP | 10-195360 A | 7/1998 |
| JP | 10-329403 A | 12/1998 |
| JP | 11-209673 A | 8/1999 |

* cited by examiner

4 μs AFTER

INK SET, INK JET RECORDING METHOD, RECORDING UNIT, INK CARTRIDGE AND INK JET RECORDING APPARATUS

BACKGROUND OF THE INVENTION

1. Field of the Invention

The present invention relates to an ink set suitable for ink jet recording, and an ink jet recording method, a recording unit, an ink cartridge and an ink jet recording apparatus each using the ink set.

2. Description of the Related Art

An ink jet recording method for color recording conventionally uses aqueous inks comprising dyes having various color tones dissolved in water-soluble media. Three color inks of cyan, magenta and yellow are generally used as color inks.

These color inks are required to have reliability in use for ink jet recording, the ability to provide a sufficient image density, a good drying property, and the ability to form a recorded image with neither blur nor flow when in contact with water or alcohol, and good weather resistance. Particularly, a high-quality ink jet image equivalent to a silver salt photograph has been recently realized, thereby creating demand not only for good image quality but also for long-term storage stability of a recorded image.

SUMMARY OF THE INVENTION

A factor that greatly contributes to the storage stability of an image is fading due to exposure to light (hereinafter, called "fading"). Therefore, formation of an image having excellent light resistance is required. Under light, a dye in an image produced with an ink tends to deteriorate, and eventually fading becomes conspicuous. Therefore, a color ink which comprises a dye having excellent light resistance, or a recording medium which can prevent light fading is used to improve the light resistance of an image.

If there is a big difference between the degree of fading in at least two color portions comprising an entire image, however, the color balance of the image tends to be upset when the entire image is exposed to light, and the entire image whose color balance is upset may give the impression that the quality is worsened. For example, in a multi-color image formed with cyan, magenta and yellow color inks, if the cyan has lower light resistance than the other two colors, the portions of the image formed with the cyan ink are greatly faded, thus decreasing the blueness of the entire image after light fading, as compared with the image immediately after printing.

Japanese Patent Laid-Open No. 10-329403 discloses an ink set having cyan, magenta and yellow inks, and the respective images' ΔE, the images being produced with the three color inks, are less than 25, 30 and 15 in a one-year pseudo-fading test with office light. However, the residual ratio of reflection density of each color is not discussed, and the respective ΔE's of the images formed with the color inks are large. Therefore, the ink set is not said to produce an image having good light resistance. Furthermore, the color balance of a full-color image using the three colors is not disclosed, and long-term storage stability is not expected.

Accordingly, the present invention provides an ink set comprising color inks that produce images having substantially the same ΔE and good residual ratios of reflection density, thereby maintaining the color balance of an image after long-term storage, and good image quality.

As a result of intensive research on various inks, the inventors found that by using an ink set comprising inks that produce respective images having substantially the same light fading ΔE and good residual ratios of reflection density, deterioration in image quality after long-term storage can be prevented without losing the color balance of the image. This resulted in the achievement of the present invention.

According to one aspect of the present invention, there is provided an ink set comprising at least three types of inks each containing a colorant and an aqueous medium, wherein in a fading test under conditions that cause fading corresponding to pseudo-indoor sunlight fading through a window for 3 years or more, respective images produced with the respective inks have the same ΔE or have differences in ΔE that are 10 or less in a CIELAB color space display system, and each of the respective images has a residual ratio of reflection density of 70% or more.

According to another aspect of the present invention, there is provided an ink set comprising at least two types of inks each containing a colorant and an aqueous medium, wherein in a fading test under conditions that cause fading corresponding to pseudo-indoor sunlight fading through a window for 3 years or more, respective images produced with the respective inks have the same ΔE or have a difference in ΔE that is 10 or less in a CIELAB color space display system, and each of the respective images has a residual ratio of reflection density of 80% or more.

By using the ink set having the above construction, it is possible to provide an ink jet recording apparatus, components associated therewith, and various recording methods such as an ink jet recording method, for obtaining a recorded image that maintains good image quality while keeping a color balance after long-term storage.

According to a further aspect of the present invention, there is provided an ink jet recording method comprising a step of discharging inks through orifices according to a recording signal to record an image on a recording medium, wherein the inks constitute the ink set used for ink jet recording.

According to a still further aspect of the present invention, there is provided a recording unit comprising an ink container containing the respective inks constituting the ink set used for ink jet recording, and a head section for discharging the respective inks.

According to a still further aspect of the present invention, there is provided an ink cartridge comprising an ink container containing the respective inks constituting the ink set.

According to a still further aspect of the present invention, there is provided an ink jet recording apparatus comprising a recording unit comprising an ink container containing the respective inks constituting the ink set used for ink jet recording, and a head section for discharging the respective inks.

According to a still further aspect of the present invention, there is provided an ink jet recording apparatus comprising a recording head for discharging inks and an ink cartridge provided with ink containers containing inks constituting the ink set for ink jet recording.

Further objects, features and advantages of the present invention will become apparent from the following description of the preferred embodiments with reference to the attached drawings.

DESCRIPTION OF THE PREFERRED EMBODIMENTS

Figure 1:
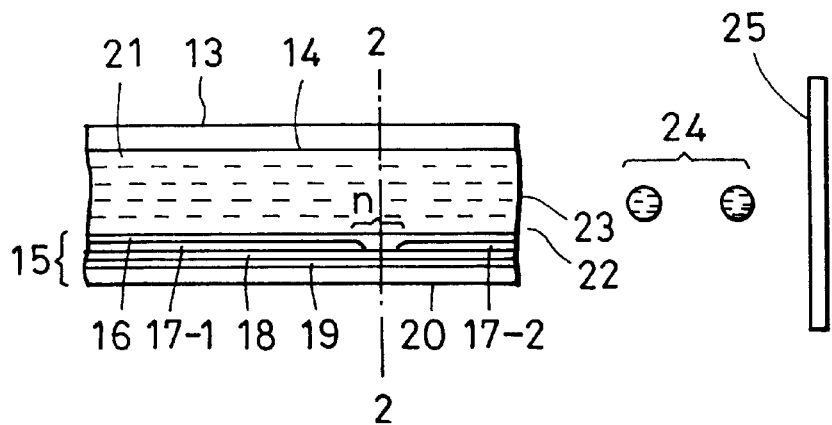
FIG. 1 is a longitudinal sectional view of a head of an ink jet recording apparatus according to an embodiment of the present invention.

In the present invention, images formed with the color inks constituting an ink set have the same level of light resistance. The color of a color ink can be represented by, for example, a CIELAB color space in which a color is defined by using the three terms of L*, a* and b*. The term L* defines the lightness of a color in the range from 0 (black) to 100 (white). The terms a* and b* define the hue and the chroma characteristics of a given color, respectively.

In the CIELAB color space, delta E ($\Delta E$) defines the difference between the color of the initial image and the color of the image after exposure to light.

A difference in $\Delta E$ represents the difference in fading between images with two colors. $\Delta E$ is represented by the following equations:

$$\Delta E = [(L^*_1 - L^*_2)^2 + (a^*_1 - a^*_2)^2 + (b^*_1 - b^*_2)^2]^{1/2} \quad \text{(Equation 1)}$$

$$\Delta E = (\Delta L^{*2} + \Delta a^{*2} + \Delta b^{*2})^{1/2} \quad \text{(Equation 2)}$$

The residual ratio of reflection density represents a value which indicates the reflection density of an image after light fading based on the reflection density of the image immediately after printing, which is set to be 100 (%). Namely, the residual ratio of reflection density represents the degree of conservation in the reflection density of the image after light fading.

The light resistance of an image formed with a color ink can be determined by using $\Delta E$ and the residual ratio of reflection density. Namely, an image that retains a high residual ratio of reflection density and that has a small $\Delta E$, even after light exposure, shows little light fading. When the respective $\Delta E$'s of the various colors in a multi-color image are on equal terms with each other, color balance can be preserved, and the multi-color image after light exposure gives the viewer little impression that the quality of the multi-color image has deteriorated, even if every color image's light fading is recognizable. The present inventors sought to obtain an ink set which can provide images having respective $\Delta E$'s, the difference between respective $\Delta E$'s being within 10 (0 "zero" inclusive), and each image's residual ratio of reflection density is 70% or more under conditions for fading corresponding to pseudo-indoor sunlight fading through a window for 3 years or more as a criterion of superior light resistance, and arrived at the present invention.

Each of the images' $\Delta E$, the images being produced with the respective inks of the ink set, is preferably 20 or less, more preferably 15 or less.

The present invention will be described in detail below with reference to preferred embodiments.

Fading Test

In the present invention, a fading test is used as a means for evaluating light fading, and the fading test is preferably performed on the assumption that an image is exposed to sunlight through a window in consideration of the storage environment of an image. From the viewpoint of long-term storage, the amount of exposure in the light fading test is preferably 6000 klux·hr or more. For example, a test performed with an illuminance of 63 klux for 100 hours corresponds to a test performed on the assumption that an image is stored for 3 years or more with an indoor sunlight exposure of 5 klux·hr per day.

The test is more preferably performed under the conditions set according to ISO 10977. ISO 10977 for simulated indoor indirect daylight through window glass will be described in detail below.

The surface temperature for a sample shall be 24° C.±2° C., maintained by an adequate airflow across samples; the ambient relative humidity shall be (50±5)%. A test unit shall consist of a xenon high-pressure arc lamp (or its equivalent) with a quartz burner tube assembly giving an illuminance of 6 klux. In addition, a standard window-glass filter shall be inserted between the lamp unit and test specimens to yield a spectral distribution that conforms closely to the CIE ID 65 Illuminant spectral.

Although the illuminance based on the ISO standards is 6 klux, a test performed with 6000 klux·hr or more requires a long time. Therefore, the illuminance may be increased to shorten the test time as long as the obtained results have reciprocity.

Recording Medium

The recording medium used in the present invention is not limited to any specific ones, but those having a coat layer such as glossy paper, coated paper and glossy film are preferably used. For high absorbency, coloring, and resolution, the recording medium having a porous particulate layer or a porous polymer layer on the substrate is preferably used.

An example of the recording medium used in the present invention will be described in further detail below. The recording medium comprises an ink receiving layer having a porous layer structure composed of fine particles on which a colorant such as a dye or pigment is adsorbed so that an image comprising the fine particles adsorbing the colorant is formed. The recording medium is particularly preferable for cases in which an ink jet method is used. Such a recording medium is preferably a type, i.e., an absorption type, in which an ink is absorbed by the voids formed in an ink receiving layer on a supporting material. The absorption-type ink receiving layer comprises a porous layer containing fine particles as a main component, and if required, a binder and other additives. Examples of the fine particles include inorganic pigments such as silica, clay, talc, calcium carbonate, kaolin, aluminum oxide such as alumina, alumina hydrate, and the like, diatomaceous earth, titanium oxide, hydrotalcite, zinc oxide, and the like; organic pigments such as urea formalin resins, ethylene resins, styrene resins, and the like. At least one of these pigments is used. As the binder, a water-soluble polymer or latex can be used. Examples of such binders include polyvinyl alcohol or a modified product thereof, starch or a modified product thereof, gelatin or a modified product thereof, gum arabic, cellulose derivatives such as carboxymethyl cellulose, hydroxyethyl cellulose, hydroxypropyl methylcellulose, and the like, SBR latex, NBR latex, methyl methacrylate-butadiene copolymer latex, functional group-modified polymer latex, vinyl copolymers such as ethylene-vinyl acetate copolymers and the like, acrylate copolymers, and the like. These polymers may be used in a combination of at least two polymers as needed. Other additives can also be used. Examples of such additives include a dispersant, a thickening agent, a pH adjuster, a lubricant, a fluidity modifier, a surfactant, an antifoaming agent, a release agent, a fluorescent whitening agent, an ultraviolet absorber, an antioxidant, and the like.

Particularly, an ink receiving layer comprising fine particles having an average particle diameter of 1 μm or less is preferred, and, for example, silica or aluminum oxide fine particles are preferably used as the fine particles. The silica fine particles preferably comprise colloidal silica. Although colloidal silica can be commercially obtained, the colloidal silica disclosed in, for example, Japanese Patent Application Nos. 2803134 and 2881847 is preferably used. The aluminum oxide fine particles preferably comprise alumina hydrate. A preferred example of such alumina pigments is alumina hydrate represented by the following formula (VII):

$$Al_2O_{3-n}(OH)_{2n} \cdot mH_2O \tag{VII}$$

In the formula (VII), n represents an integer of 1, 2 or 3, and m represents a value of 0 to 10, and preferably 0 to 5. However, both of m and n are not 0 at the same time. In many cases, $mH_2O$ represents an elimination water phase which does not participate in the formation of the $mH_2O$ crystal lattice, and thus m may or may not be an integer. In heating such a material, m reaches 0 in some cases. A preferred example of the alumina hydrate is one generally produced by a known method such as a method of hydrolyzing aluminum alkoxide or sodium aluminate as disclosed in U.S. Pat. Nos. 4,242,271 and 4,202,870, a method of adding an aqueous solution of sodium sulfate or aluminum chloride to an aqueous solution of sodium aluminate or the like to neutralize it as disclosed in Japanese Patent Publication No. 57-44605.

Figure 24:
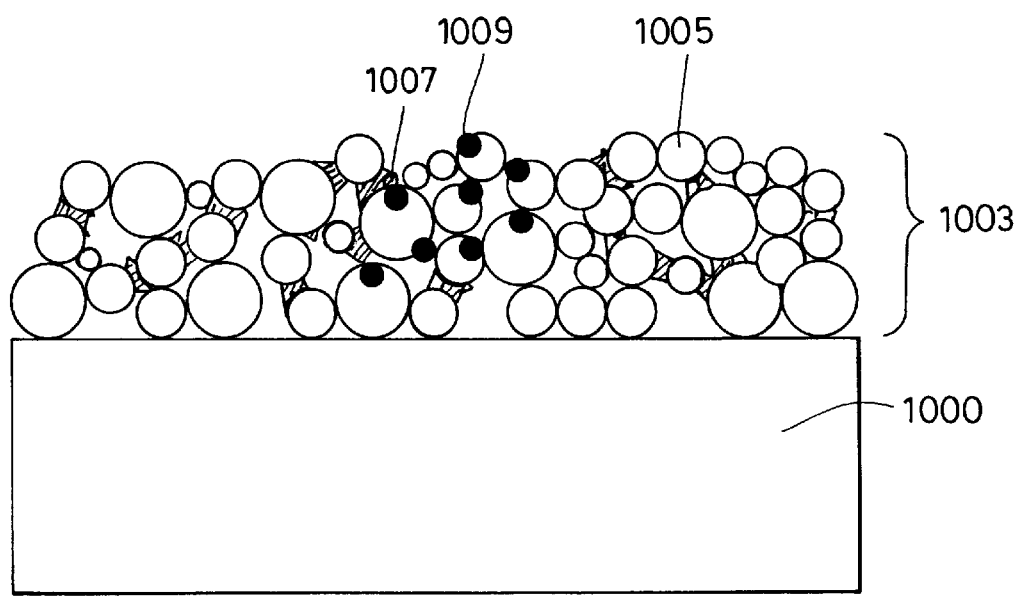
FIG. 24 is a schematic drawing showing the sectional structure of an example of a recording medium used in the present invention.

FIG. 24 schematically shows the sectional structure of an example of so-called coated paper comprising an ink receiving layer formed on a support material made of paper or the like. In FIG. 24, reference numeral 1000 denotes a support material, and reference numeral 1003 denotes a coated layer serving as an ink receiving layer supported by the support material 1000. The coated layer 1003 is formed as a porous layer containing fine particles 1005 which are fixed by a binder 1007. Therefore, in the step in which ink droplets applied to the coated paper penetrate into the coated layer 1003, a colorant 1009 contained in an ink is adsorbed on the surfaces of the fine particles 1005, and the colorant adsorbed by the fine particles is fixed to form an image.

Colorant

In accordance with an embodiment of the present invention, color inks include two or three color inks selected from, for example, cyan, magenta and yellow, or at least two types of color inks having the same color tone and different amounts of colorants. Although colorants used for the color inks are not limited, water-soluble xanthene dyes, triphenylmethane dyes, anthraquinone dyes, monoazo dyes, disazo dynes, trisazo dyes, tetrazo dyes and copper phthalocyanine dyes are preferred. One or more of these colorants may be contained in the same ink. The content of the colorant in the ink is preferably 0.1 to 15.0% by weight, and more preferably in the range of 0.5 to 5.0% by weight, based on the total weight of the ink.

When an ink set according to an embodiment of the present invention contains magenta ink, at least a colorant represented by the following formula (I) is preferably used.

Formula (I)

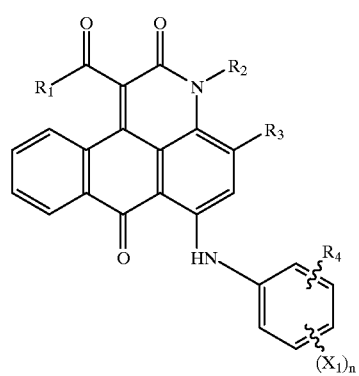

wherein $R_1$ represents a substituted or unsubstituted alkoxy group, or a substituted or unsubstituted aryl group; $R_2$ and $R_4$ independently represent a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ represents a carboxyl group or a salt thereof, or a sulfonic acid group or a salt thereof; and n represents 1 or 2.

With respect to $R_1$ to $R_4$ in formula (I), examples of $R_1$ include a straight chain or branched alkoxy group having 1 to 4 carbon atoms, a substituted or unsubstituted phenyl group, an d the like. Examples of substituents of a phenyl group include a methyl group, a hydroxyl group, a nitro group, a sulfonic acid group or a salt thereof, a carboxyl group or a salt thereof, a halogen atom (fluorine, chlorine, bromine, or the like), and the like. Examples of $R_2$ include a hydrogen atom, a straight chain or branched lower alkyl group having 1 to 4 carbon atoms, and the like. Examples of $R_3$ include a hydrogen atom, a straight chain or branched alkyl group having 1 to 4 carbon atoms, a straight chain or branched alkoxy group having 1 to 4 carbon atoms, an aryloxy group such as a phenoxy group, and the like. An aryl group which constitutes an aryloxy group may be substituted by, for example, a straight chain or branched alkyl group having 1 to 10 carbon atoms, a sulfonic group or a salt thereof, a carboxyl group or a salt thereof, or the like. Examples of $R_4$ include a hydrogen atom, a straight chain or branched lower alkyl group having 1 to 4 carbon atoms, and the like. Examples of $X_1$ include —COOM or —$SO_3M$ (wherein M is a hydrogen atom, an alkali metal such as Li, Na, or the like, ammonium ($NH_4$), organic ammonium ($N(R_8)_4$)), and the like. $R8_5$ is a methyl group, an ethyl group, or the like.

Although examples of the colorant represented by formula (I) are given below, the present invention is not limited to these examples. At least two colorants may be simultaneously used in the same ink.

Examples of colorant compounds represented by formula (I) have the following structures.

Compound Example I-1

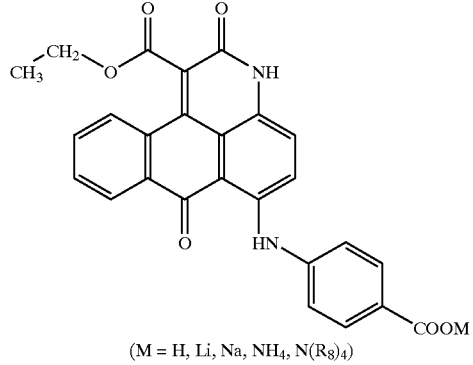

(M = H, Li, Na, $NH_4$, $N(R_8)_4$)

Compound Example I-2

(M = H, Li, Na, $NH_4$, $N(R_8)_4$)

Compound Example I-3

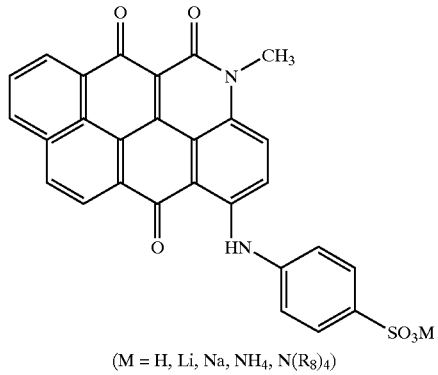

(M = H, Li, Na, $NH_4$, $N(R_8)_4$)

Compound Example I-4

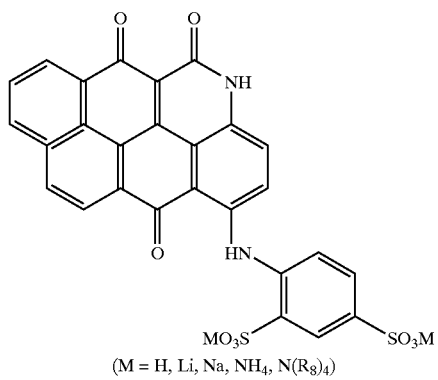

(M = H, Li, Na, $NH_4$, $N(R_8)_4$)

Compound Example I-5

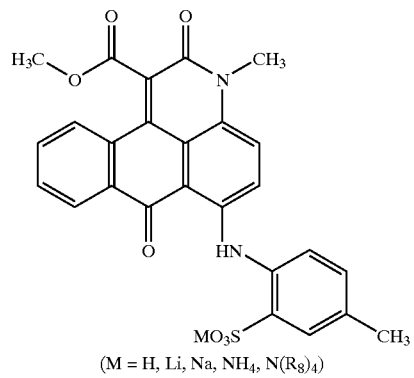

(M = H, Li, Na, $NH_4$, $N(R_8)_4$)

Compound Example I-6

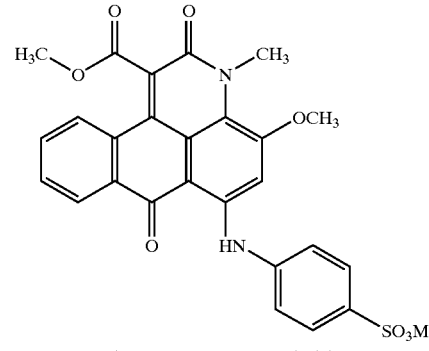

(M = H, Li, Na, $NH_4$, $N(R_8)_4$)

Compound Example I-7

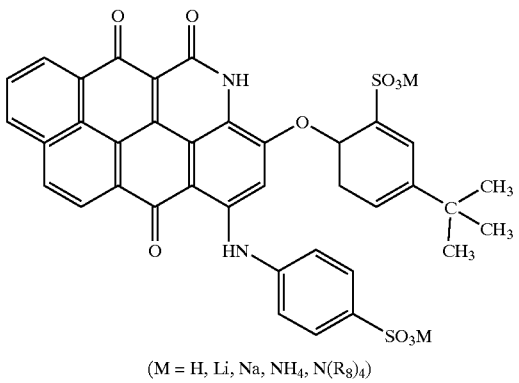

(M = H, Li, Na, NH$_4$, N(R$_8$)$_4$)

A colorant of magenta ink preferably comprises at least one colorant represented by the formula (I), and at least one of the colorants represented by the formulae (II) or (III) below and colorants having a xanthene structure.

Formula (II)

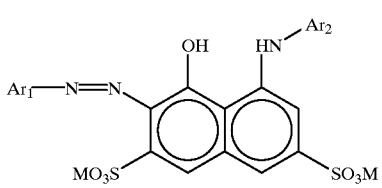

wherein Ar$_1$ represents a substituted or unsubstituted phenyl group, or a substituted or unsubstituted naphthyl group; Ar$_2$ is selected from the group consisting of an acetyl group, a benzoyl group, a 1,3,5-triazinyl group, a SO$_2$—C$_6$H$_5$ group and a SO$_2$—C$_6$H$_4$—CH$_3$ group; and M represents a counter ion of the sulfonic acid group, for example, a hydrogen atom, an alkali metal such as Li, Na, or the like, an ammonium (NH$_4$) or an organic ammonium (N(R$_9$)$_4$), and the like. R$_9$ is a methyl group, an ethyl group, or the like. A phenyl group or naphthyl group as Ar$_1$ may be substituted by, for example, at least one group or atom selected from a carboxyl group or a salt thereof, a sulfonic group or a salt thereof, a straight chain or branched alkyl group having 1 to 4 carbon atoms, a halogen atom (fluorine, chlorine, bromine, or the like), an alkoxy group having 1 to 4 carbon atoms, an aryloxy group such as a phenoxy group, and the like. When Ar$_2$ is a benzoyl group or 1,3,5-triazinyl group, at least one hydrogen atom in a benzene ring or a 1,3,5-triazine ring may be substituted by a carboxyl group or a salt thereof, a halogen atom (fluorine, chlorine, bromine, or the like), or a primary, secondary or tertiary amino group, or alkoxy group, or hydroxy group.

In the above formula (III), Ar$_3$ and Ar$_4$ independently represent a substituted or unsubstituted phenyl group, or a substituted or unsubstituted naphthyl group. Examples of substituents of a phenyl group or naphthyl group include a straight chain or branched alkyl group having 1 to 4 carbon atoms, a straight chain or branched alkoxy group having 1 to 4 carbon atoms, a hydroxyl group, a carboxyl group or a salt thereof, a sulfonic acid group or a salt thereof, a halogen atom (fluorine, chlorine, bromine, or the like), and the like. At least one of Ar$_3$ and Ar$_4$ has a substituent such as a carboxyl group or a salt thereof, a sulfonic acid group or a salt thereof. M represents a counter ion of a sulfonic group, for example, a hydrogen atom, an alkali metal such as Li, Na, or the like, ammonium (NH$_4$) or organic ammonium (N(R$_{10}$)$_4$), and the like. R$_5$ represents 1.3.5-triazinediyl group, at least one hydrogen atom in a 1,3,5-triazine ring may be substituted by a carboxyl group or a salt thereof, a halogen atom (fluorine, chlorine, bromine or the like), or a primary, secondary or tertiary amino group, or alkoxy group, or hydroxy group. R$_6$ and R$_7$ are independently selected from the group consisting of a hydrogen atom, a substituted or unsubstituted alkyl group, a substituted or unsubstituted alkenyl group, a substituted or unsubstituted aralkyl group, and an atomic group necessary for forming a perhydroxyazine ring together with N, and L represents a bivalent organic coupling group. Examples of R$_6$ and R$_7$ include a straight chain or branched alkyl group having 1 to 6 carbon atoms, a straight chain or branched alkenyl group having 1 to 4 carbon atoms, a benzyl group, and the like. Examples of substituents of an alkyl group, an alkenyl group, and a benzyl group include a hydroxyl group, a carboxyl group or a salt thereof, a sulfonic acid group or a salt thereof, and the like.

Examples of colorant compounds represented by the formula (II) include C. I. Reactive Red 180, compounds having the following structures, and compounds having the structures disclosed in Japanese Patent Laid-Open Nos. 8-7391 and 11-209673.

Compound Example II-8

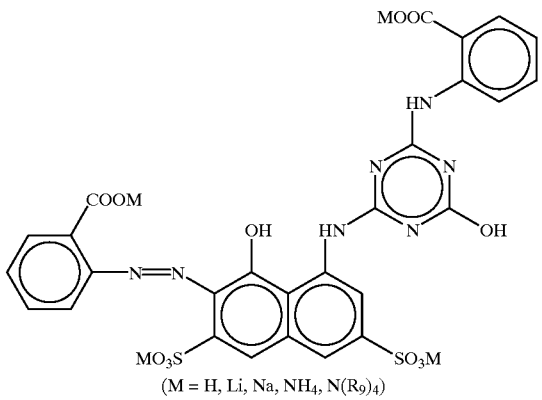

(M = H, Li, Na, NH$_4$, N(R$_9$)$_4$)

Formula (III)

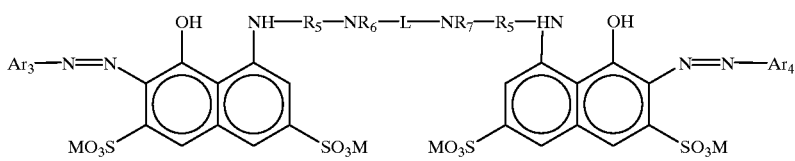

Compound Example II-9

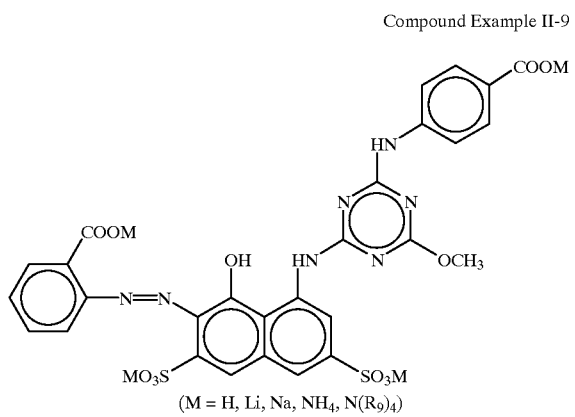

(M = H, Li, Na, NH$_4$, N(R$_9$)$_4$)

Compound Example II-10

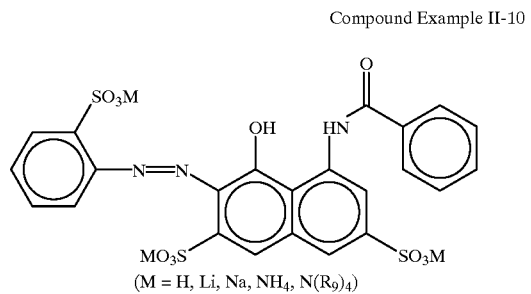

(M = H, Li, Na, NH$_4$, N(R$_9$)$_4$)

Compound Example II-11

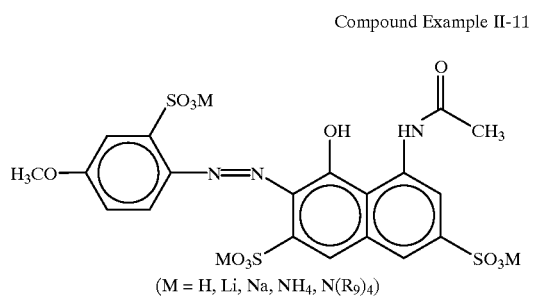

(M = H, Li, Na, NH$_4$, N(R$_9$)$_4$)

Compound Example II-12

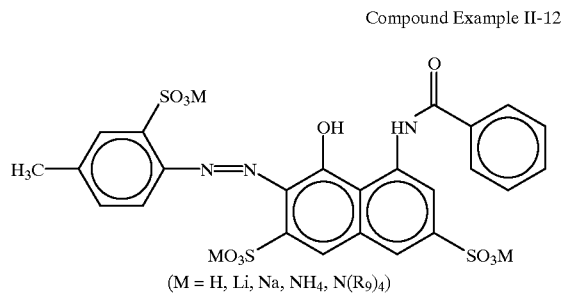

(M = H, Li, Na, NH$_4$, N(R$_9$)$_4$)

Compound Example II-13

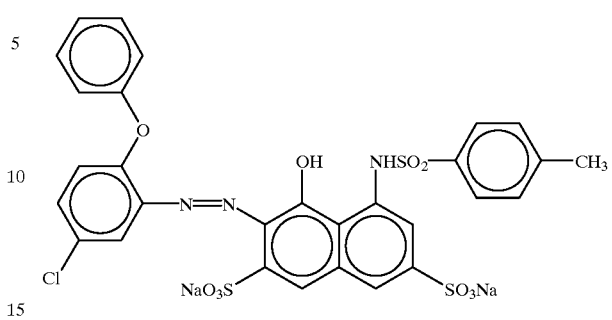

Examples of colorant compounds represented by formula (III) include compounds having the following structures.

Compound Example III-14

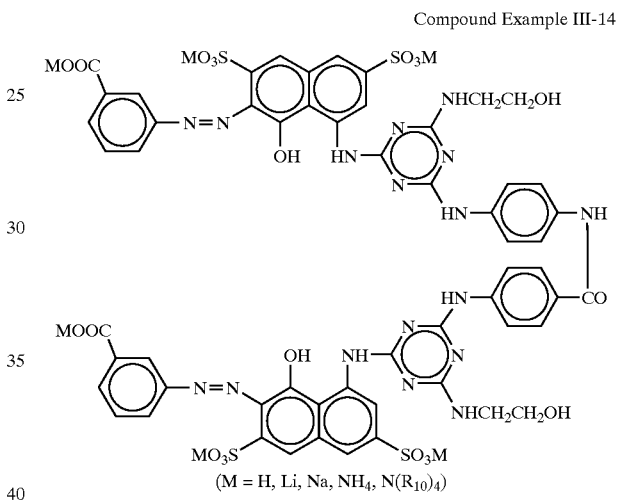

(M = H, Li, Na, NH$_4$, N(R$_{10}$)$_4$)

Compound Example III-15

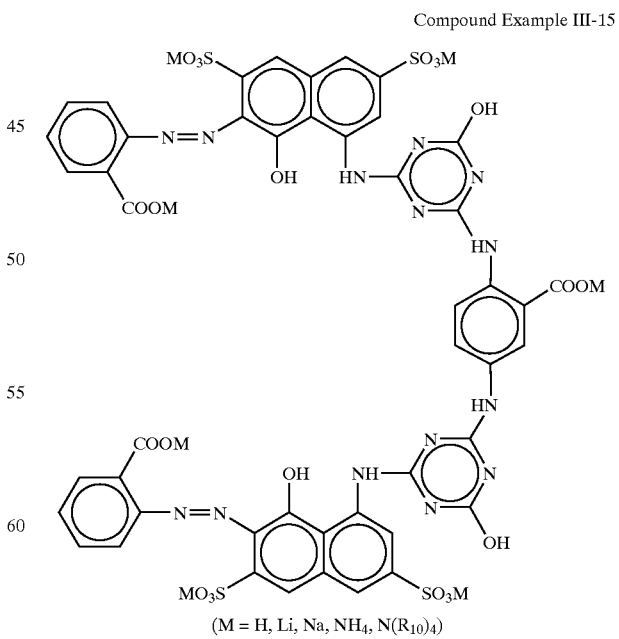

(M = H, Li, Na, NH$_4$, N(R$_{10}$)$_4$)

-continued
Compound Example III-16
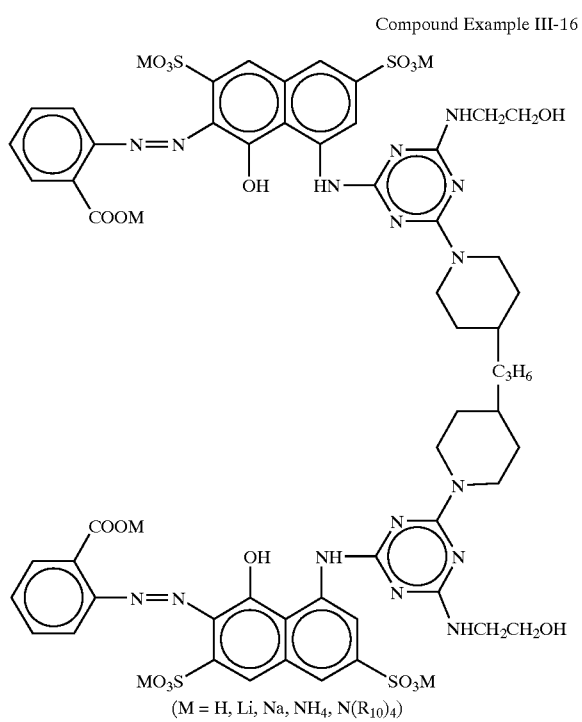
(M = H, Li, Na, NH$_4$, N(R$_{10}$)$_4$)
Compound Example III-17
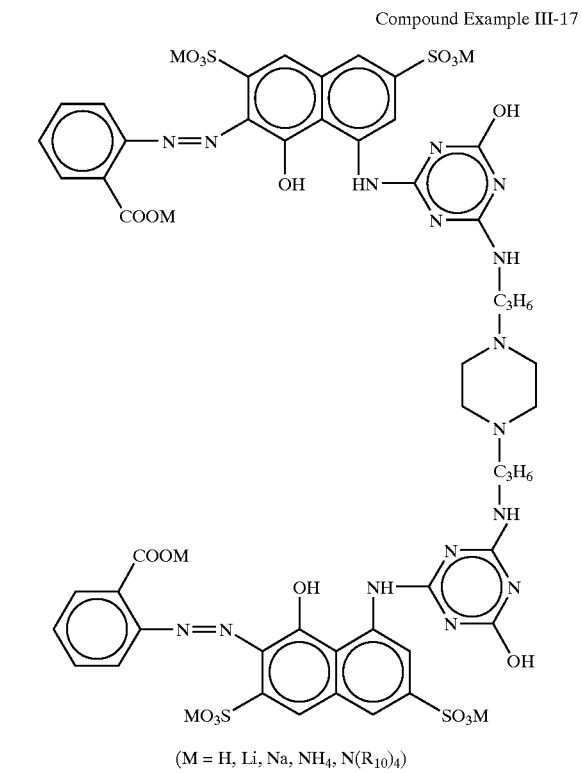
(M = H, Li, Na, NH$_4$, N(R$_{10}$)$_4$)
Compound Example III-18
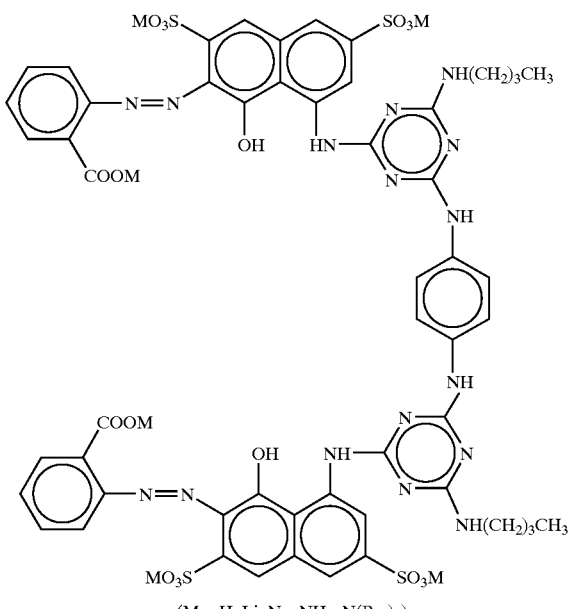
(M = H, Li, Na, NH$_4$, N(R$_{10}$)$_4$)
Compound Example III-19
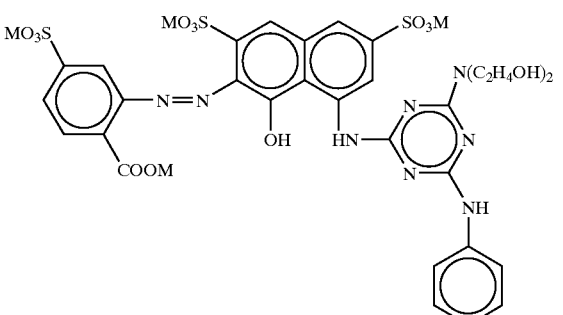
(M = H, Li, Na, NH$_4$, N(R$_{10}$)$_4$)
Compound Example III-20
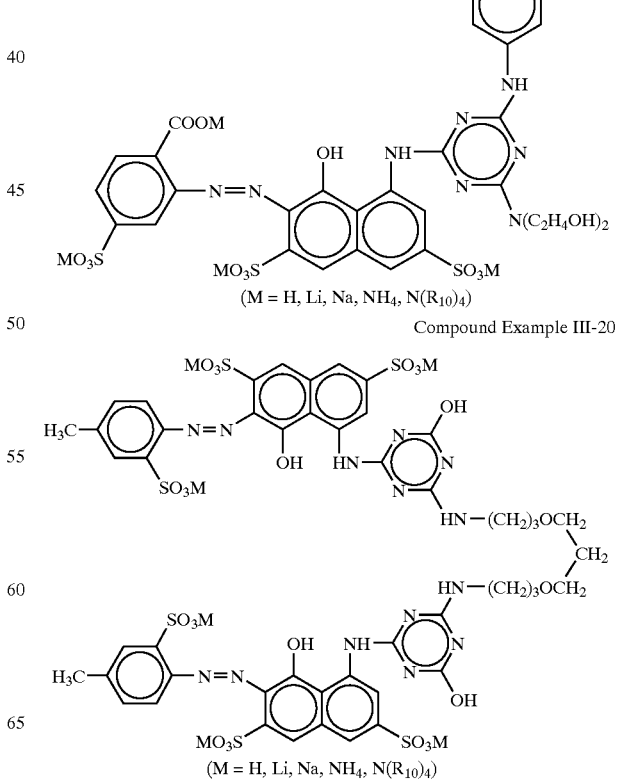
(M = H, Li, Na, NH$_4$, N(R$_{10}$)$_4$)

Compound Example III-21

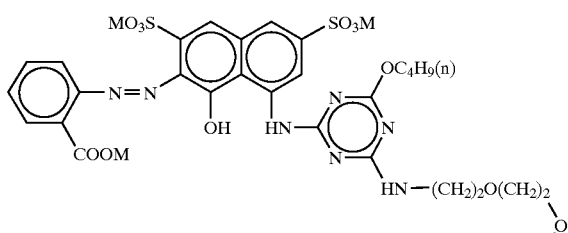

Compound Example III-22

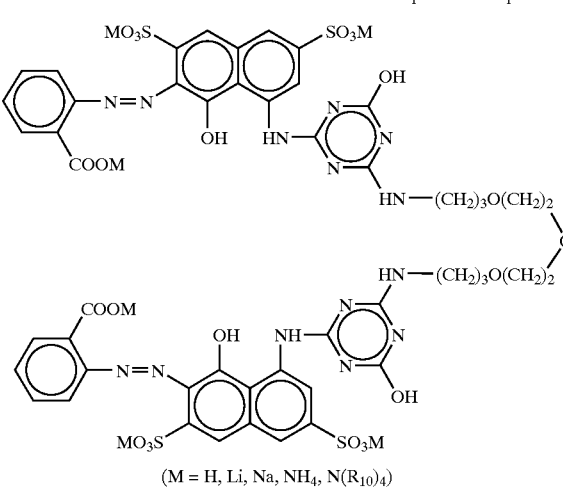

(M = H, Li, Na, NH$_4$, N(R$_{10}$)$_4$)

Examples of colorants having the xanthene structure include C. I. Acid Red 52, 92, 94 and 289, and the like.

In a magenta ink according to an embodiment of the present invention, the ratio by weight of a colorant represented by formula (I) to a colorant (at least one of colorants represented by formula (II) or (III), and colorants having the xanthene structure) other than the colorant represented by formula (I) is preferably in the range of 95:5 to 20:80 in consideration of the effect of obtaining a clear color tone, a high image density and excellent light resistance.

When an ink set according to an embodiment of the present invention contains a cyan ink, a copper phthalocyanine dye is preferably used as a colorant of the cyan ink. Examples of colorants having the phthalocyanine structure include C. I. Acid Blue 249, C. I. Direct Blue 86, C. I. Direct Blue 199, C. I. Direct Blue 307, and the like. Another cyan colorant may be combined with the copper phthalocyanine dye. In a combination of two dyes, the ratio by weight of the copper phthalocyanine dye to the other dye is preferably in the range of 95:5 to 20:80.

When an ink set according to an embodiment of the present invention contains a yellow ink, Direct Yellow 132 is preferably used as a colorant of the yellow ink.

An ink set according to an embodiment of the present invention may further contain a black ink. In this case, like the other color inks, the black ink is preferably added so that the inks have a difference in fading ΔE of 10 or less in a CIELAB color space display system after pseudo-indoor light fading for 3 years or more, and each of the inks has a residual ratio of reflection density of 70% or more, preferably 80% or more. Examples of such a black ink include dye-based black inks, and pigment-based black inks.

In the use of a dye-based black ink, at least one selected from compounds represented by the following formulae (IV) to (VI) can be used as a dye for the black ink.

(IV)

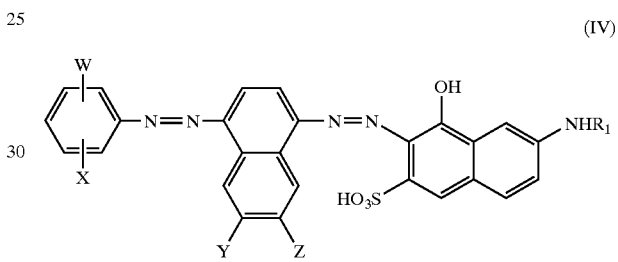

wherein W represents a carboxyl group, X represents a hydrogen atom, a carboxyl group, or a sulfonic group, Y represents a hydrogen atom, a carboxyl group, or a sulfonic group, Z represents a hydrogen atom, a carboxyl group, or a sulfonic group, and R$_1$ represents a hydrogen atom, an alkyl group substituted by at least one of a carboxyl group and an alkoxy group, a substituted or unsubstituted phenyl group, or a substituted or unsubstituted alkanoyl group. Examples of substituents of a phenyl group and an alkanoyl group include a hydroxyl group, a carboxyl group, a sulfonic group and an alkoxy group, and the like.

In the formula (IV), a carboxyalkyl group represented by R$_1$ is preferably a carboxyalkyl group having an alkyl group of C1–6 (meaning 1 to 6 carbon atoms hereinafter), and more preferably a carboxyalkyl group having an alkyl group of C1–4.

(V)

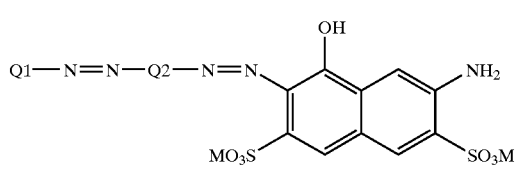

(VI)

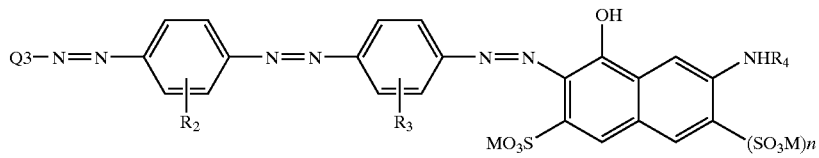

wherein Q1 represents a phenyl group or naphthyl group substituted by at least one selected from lower alkylcarbonylamino groups and lower alkoxy groups, or a naphthyl group substituted by a sulfonic group; Q2 represents a naphthyl group substituted by a sulfonic group or a phenyl group substituted by a lower alkoxy group; Q3 represents an unsubstituted or $SO_3M$ group-substituted phenyl group or naphthyl group; $R_2$ and $R_3$ independently represent a lower alkyl group, a lower alkoxy group or a lower alkylcarbonyl group; $R_4$ represents a hydrogen atom or a phenyl group substituted by a sulfonic group; m is 0 or 1; M represents an alkali metal such as Li, Na, or the like, ammonium ($NH_4$), organic ammonium ($N(R_5)_4$), or the like. Examples of $R_5$ include a methyl group, an ethyl group, and the like.

In the structures of the dyes represented by formulae (V) and (VI), a lower alkylcarbonylamino group is preferably a C1–4 alkylcarbonylamino group, a lower alkoxy group is preferably a C1–4 alkoxy group, and a lower alkyl group is preferably a C1–4 alkyl group.

Examples of dyes represented by the above formula (V) include the compounds represented by the following structural formulae 23 to 27.

Compound Example 23

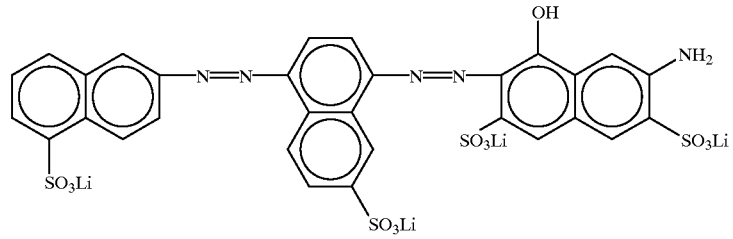

Compound Example 24

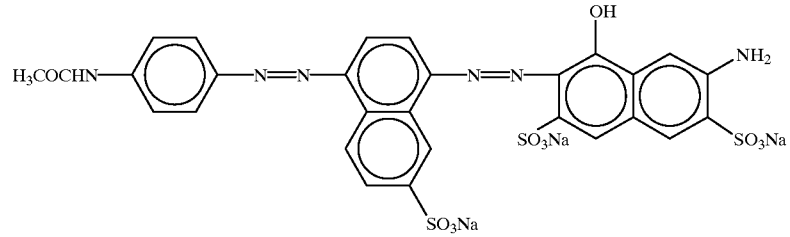

Compound Example 25

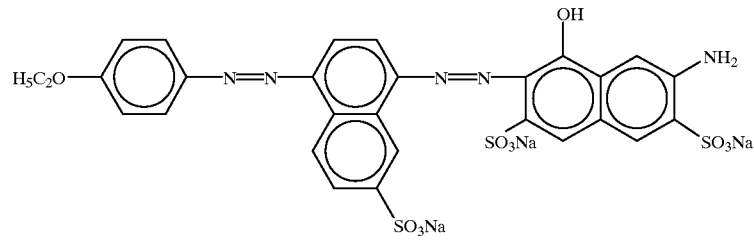

Compound Example 26

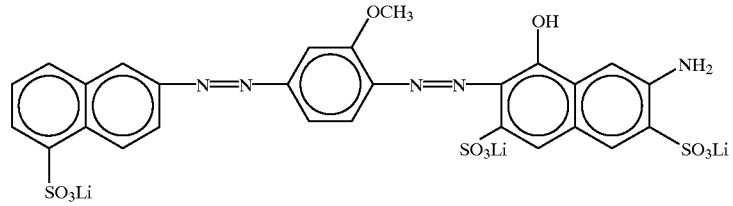

Compound Example 27

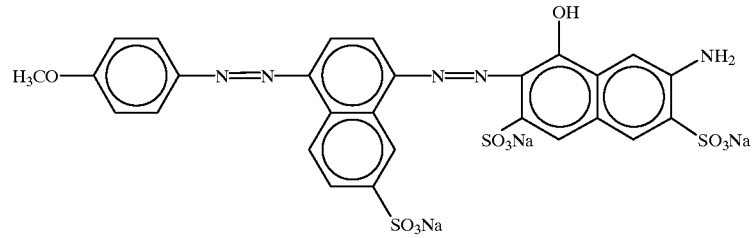

Examples of dyes represented by the above formula (VI) include the compounds represented by the following structural formulae 28 to 32.

Compound Example 28

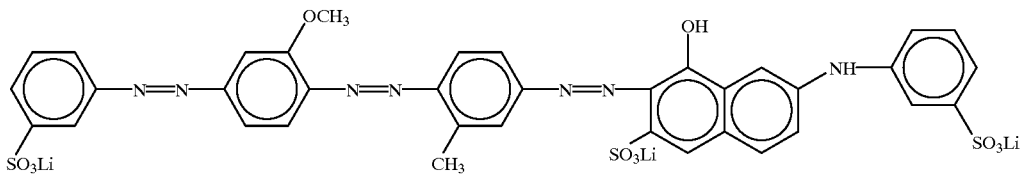

Compound Example 29

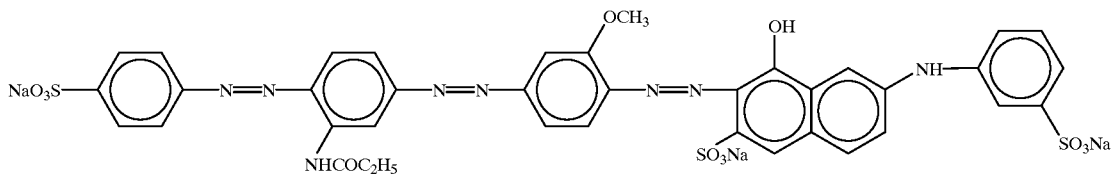

Compound Example 30

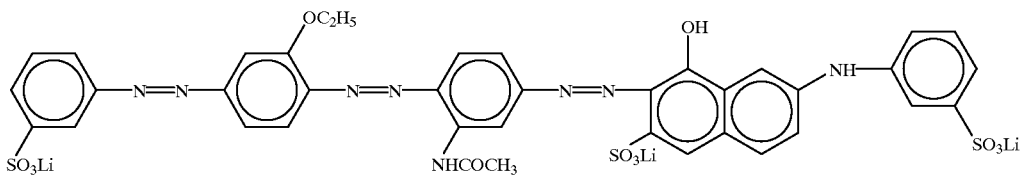

Compound Example 31

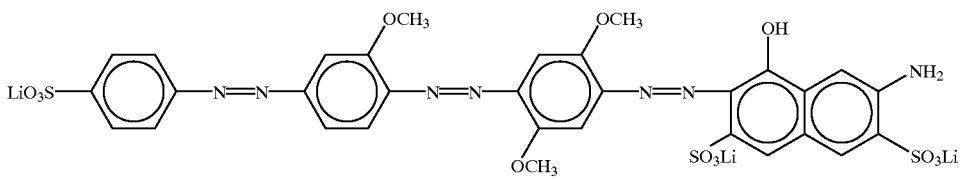

Compound Example 32

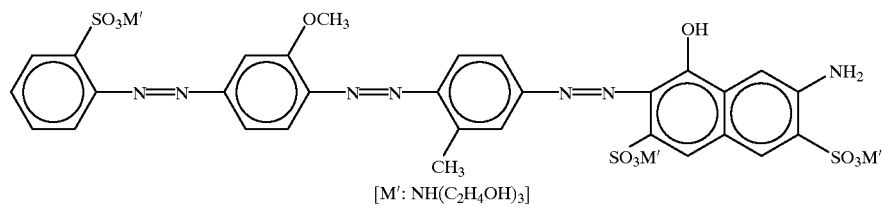

[M': NH(C₂H₄OH)₃]

Other examples of dyes include C. I. Direct Black 17, 19, 32, 51, 71, 90, 108, 146, 154, 168, and 195, C. I. Food Black 1 and 2, and the like. These black dyes may be used singly or in an appropriate combination within the scope of the present invention.

Examples of the pigment-based black inks include pigment-based inks each comprising a self-dispersing carbon black as a colorant, as disclosed in Japanese Patent Laid-Open No. 10-195360. Such inks have excellent light resistance, and the ability to form a character with excellent quality. Therefore, a combination of the black ink and the above-described color ink set can provide a multi-color image with less deterioration over time, and a print having excellent character quality.

The yellow, magenta and cyan color inks each containing any of the above various colorants have excellent compatibility with a recording medium among the above-described recording media, which contains alumina hydrate fine particles in the ink receiving layer, and can satisfy, to a high degree of the conditions that the difference in fading $\Delta E$ in the fading test according to the present invention is 10 or less, and that the images have residual ratios of reflection density of 70% or more, and preferably 80% or more. Although the reason why the colorants have good compatibility with the recording medium is not known, colorant adsorption on alumina hydrate possibly contributes to suppression of deterioration of the colorants.

The color tones of the color inks, and a combination of the colorants of the color inks which permits achievement of a high level of light resistance are given below.

Magenta ink: A mixture of a dye represented by formula (I) and at least one dye selected from the group consisting of the dyes represented by formulae (II) or (III), and dyes having the xanthene structure. More specifically, a mixture of Compound Examples I-7 and II-8 and C. I. Acid Red 289.

Cyan ink: Direct Blue 199

Yellow ink: Direct Yellow 132

When a black ink is added to the ink set comprising the YMC color inks, an ink containing, for example, C. I. Food Black 2 and Compound Examples 23 and 28 as colorants is preferably used.

According to another aspect of the ink set of the present invention, an ink set comprises at least a first ink and a second ink having the same color tone, the second ink having a lower colorant content than that of the first ink. The lower colorant content is, for example, 2% or less of the total weight of the ink. In this case, the degree of fading of the image formed with the second ink is preferably the same as or lower than that of the image formed with the first ink.

In a case of the first and second inks having a magenta color tone, the second ink containing dye represented by formula (I) as a sole colorant is preferably used. In a case of the first and second inks having a cyan color tone, the second ink containing Direct Blue 199 as a sole colorant is preferably used.

Aqueous Medium

Each of the inks of the ink set of the present invention uses an aqueous medium mainly composed of water as a liquid medium for dissolving or dispersing the colorant used in the present invention. As the aqueous medium, water or a mixture of water and a water-soluble organic solvent can be used. The water-soluble organic solvent is not limited as long as it exhibits water solubility. Examples of such organic solvents include alcohol, polyhydric alcohol, polyglycol, glycol ether, nitrogen-containing polar solvents, sulfur-containing polar solvents, and the like. These solvents are used as an agent for maintaining the moisture retention of the inks, improving the solubility of the colorants, and improving the penetrability of the inks into recording paper. The content of the water-soluble organic solvent is preferably in the range of 1 to 40% by weight, and more preferably in the range of 3 to 30% by weight, of the total weight of the ink. The moisture content of each of the inks is preferably in the range of 30 to 95% by weight in order to keep the dye solubility and the ink discharge stability good.

Additives

In order to maintain the moisture retention of the inks, a moisturizing solid such as urea, a urea derivative, trimethylol propane, or the like may be used as an ink component. The content of the moisturizing solid such as urea, urea derivative, trimethylol propane, or the like in an ink is preferably in the range of 0.1 to 20.0% by weight, and more preferably in the range of 3.0 to 10.0% by weight. Besides the above components, the ink of the present invention may further contain various additives such as a surfactant, a pH adjuster, an anti-rust agent, an antiseptic agent, a fungicide, an antioxidant, a reduction inhibitor, an evaporation accelerator, a chelating agent, a water-soluble polymer, and the like.

pH

When a colorant having low solubility in water in a low pH region is used for an ink of the present invention, the pH of the ink is preferably maintained in the alkali region in order to prevent clogging at the nozzle tip and to promote long-term storage stability. With an ink having a pH of over 11.0, dissolution or corrosion of a member which constitutes recording means in contact with the ink easily proceeds. Therefore, the pH of an ink is preferably in the range of 7.0 to 11.0.

Ink Jet Recording Apparatus and Ink Jet Recording Method

Figure 2:
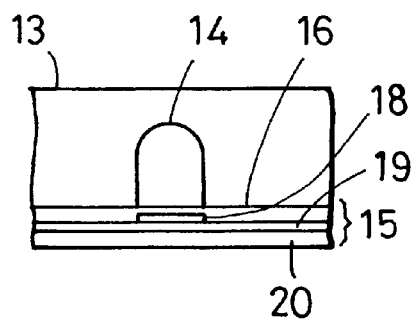
FIG. 2 is a sectional view taken along line 2—2 in FIG. 1.

As an ink jet recording apparatus to which the ink set of the present invention can be applied, an example of a construction of a head serving as a principal portion of an apparatus utilizing heat energy is shown in FIGS. 1 and 2.

FIG. 1 is a sectional view of a head 13 taken along an ink passage, and FIG. 2 is a sectional view taken along line 2—2 in FIG. 1. The head 13 is obtained by bonding a glass, ceramic, silicon or plastic plate having a passage (nozzle) 14 through which an ink 21 is passed, and a heating element substrate 15. The heating element substrate 15 comprises a protecting layer 16 made of silicon oxide, silicon nitride, silicon carbide, or the like, electrodes 17-1 and 17-2 made of aluminum, gold, an aluminum-copper alloy, or the like, a heating resistor layer 18 made of a high-melting-point material such as $HfB_2$, TaN, TaAl, or the like, a heat storage layer 19 made of thermally formed silicon oxide, aluminum oxide, or the like, and a substrate 20 made of a material with high heat radiation property, such as silicon, aluminum, aluminum nitride, or the like.

When a pulsed electric signal is applied to the electrodes 17-1 and 17-1 of the head 13, the area of the heating element substrate 15 that is denoted by n in FIG. 1 is rapidly heated to generate bubbles in the ink 21 in contact with the surface of the area n, and a meniscus 23 is projected by the pressure produced due to the bubbles to discharge the ink through the nozzle 14 of the head. As a result, ink droplets 24 are ejected from a discharge orifice 22 to a recording material 25.

Figure 3:
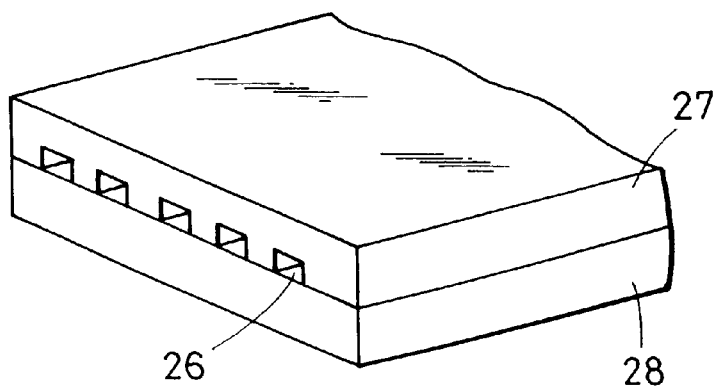
FIG. 3 is a schematic drawing illustrating a multi-head.

FIG. 3 shows the appearance of a multi-head comprising a plurality of the heads shown in FIG. 1 which are arranged in a line. The multi-head is obtained by bonding a glass plate 27 comprising a multi-nozzle 26 and a heat generating head 28 similar to that shown in FIG. 1.

Figure 4:
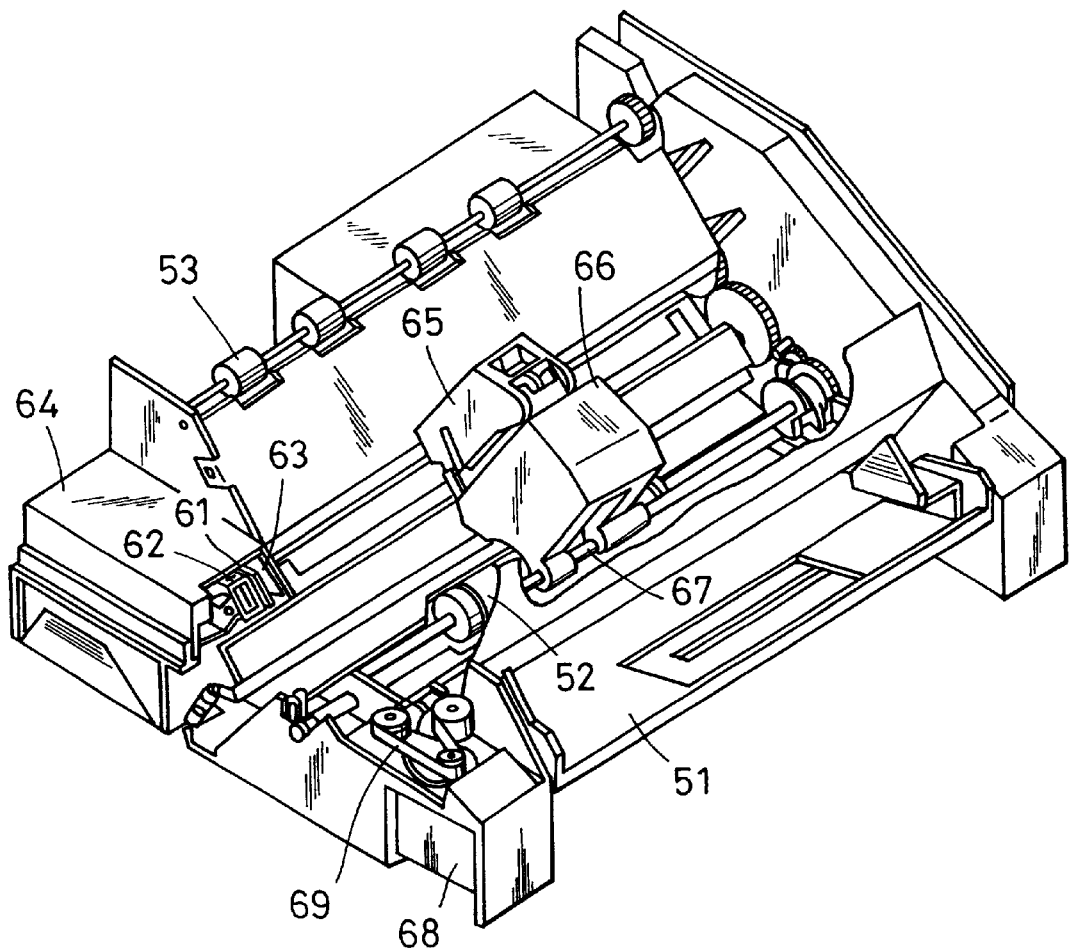
FIG. 4 is a schematic perspective view showing an ink jet recording apparatus according to another embodiment of the present invention.

FIG. 4 shows an example of an ink jet recording apparatus comprising the multi-head. In FIG. 4, reference numeral 61 denotes a blade serving as a wiping member, in which an end is held and kept by a blade holding member to assume a cantilever form. The blade 61 is arranged adjacent to a recording region of a recording head 65. In this example, the blade 61 is held so as to protrude into the movement path of the recording head 65.

Reference numeral 62 denotes a cap for the orifice surface of the recording head 65, which is provided at a home position adjacent to the blade 61 and moved vertically to the movement direction of the recording head 65 so that a capping structure is prepared in contact with the ink orifice surface. Reference numeral 63 denotes an ink absorber which is held adjacent to the blade 61 so as to protrude into the movement path of the recording head 65 in the same manner as the blade 61. The blade 61, the cap 62 and the ink absorber 63 constitute a discharge recovery unit 64 so that moisture, dust particles, and the like on the orifice surface are removed by the blade 61 and the ink absorber 63.

The recording head 65 comprises discharge energy generating means for discharging an ink to the recording medium opposite to the orifice surface having orifices to record an image. Reference numeral 66 denotes a carriage on which the recording head 65 is mounted to move the recording head 65. The carriage 66 is slidably engaged with a guide shaft 67 and is partly connected (not shown) to a belt 69 driven by a motor 68. This enables movement of the carriage 65 along the guide shaft 67, and movement within the recording region of the recording head 65 and the adjacent region. Reference numeral 51 denotes a paper feeding unit for inserting the recording medium, and reference numeral 52 denotes a paper feeding roller driven by a motor (not shown in the drawing).

In the above-described construction, the recording medium is supplied to a position opposite to the orifice surface of the recording head 65, and expelled to a paper-expelling unit comprising paper-expelling rollers 53 with the progress of recording. In the above construction, when the recording head 65 is returned to the home position after completion of recording, the cap 62 of the discharge recovery unit 64 is retracted from the movement path of the recording head 65, while the blade 61 protrudes into the movement path. As a result, the orifices of the recording head 65 are wiped. When the cap 62 is brought into contact with the orifice surface of the recording head 65 to cap the orifice surface, the cap 62 is moved to protrude into the movement path of the recording head 65. When the recording head 65 is moved to the recording start position from the home position, the cap 62 and the blade 61 are located at the same positions as in wiping. As a result, the orifice surface of the recording head 65 is also wiped during this movement.

The recording head 65 is moved to the home position not only at the times of completion of recording and discharge recovery but also during movement within the recording region in which the recording head is moved to the home position adjacent to the recording region at predetermined intervals to wipe the orifice surface accompanying the movement.

Figure 5:
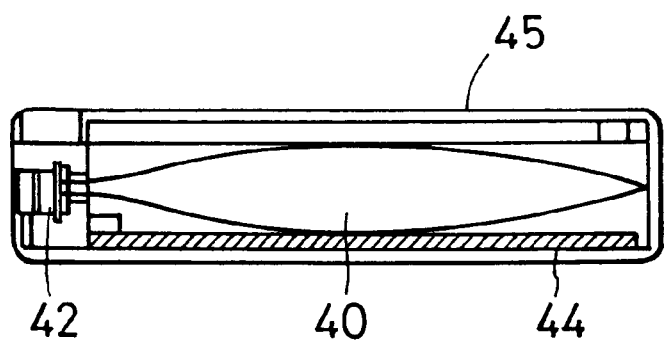
FIG. 5 is a longitudinal sectional view of an ink cartridge according to still another embodiment of the present invention.

FIG. 5 is a drawing showing an example of an ink cartridge 45 containing an ink to be supplied to the recording head through an ink supply member, for example, a tube. In this drawing, reference numeral 40 denotes an ink containing section, for example, an ink bag, which contains an ink to be supplied, a rubber stopper 42 being provided at the tip of the ink containing section 40. A needle (not shown in the drawing) is inserted into the stopper 42 so that the ink in the ink bag 40 can be supplied to the head. Reference numeral 44 denotes an ink absorber which receives waste ink. The ink containing section preferably comprises a wetted surface in contact with the ink that is made of polyolefin, particularly polyethylene.

Figure 6:
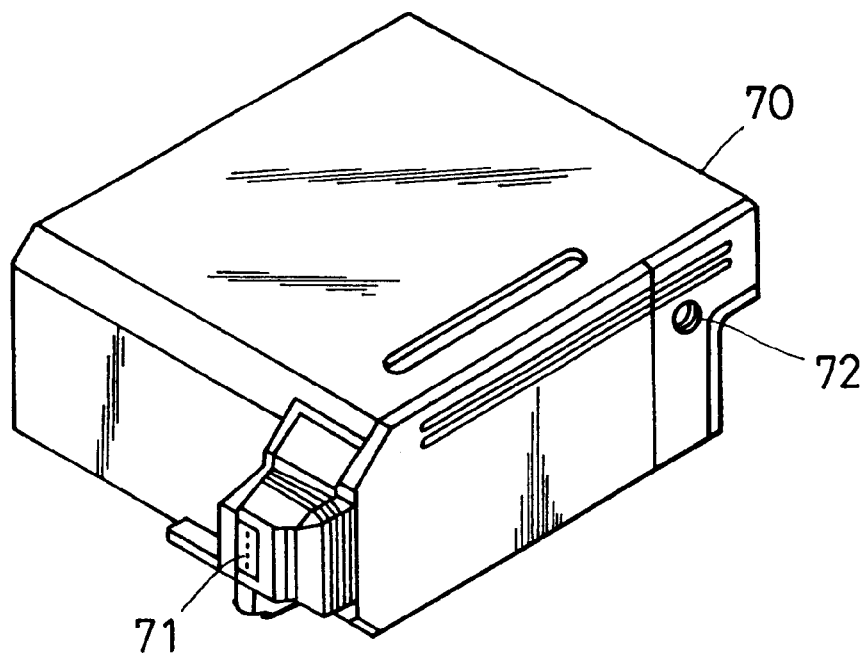
FIG. 6 is a perspective view showing an example of a recording unit.

As the ink jet recording apparatus used in the present invention, not only an apparatus comprising a head and an ink cartridge, which are provided separately as described above, but also an apparatus comprising a head and an ink cartridge which are integrally provided, as shown in FIG. 6 can be preferably used. In FIG. 6, reference numeral 70 denotes a recording unit containing an ink receiving section, for example, an ink absorber, which contains an ink so that the ink contained in the ink absorber is discharged as ink droplets from a head section 71 having a plurality of orifices. In the present invention, polyurethane is preferably used as a material for the ink absorber. The ink receiving section may comprise an ink bag in which a spring or the like is incorporated, without using the ink absorber. Reference numeral 72 denotes an air communication port for communicating the inside of the cartridge with the air. The recording unit 70 is used in place of the recording head shown in FIG. 4, and is detachable from the carriage 66.

Another example of the ink jet recording head is an ink jet recording apparatus utilizing dynamic energy and comprising an on-demand ink jet recording head which comprises a nozzle forming substrate having a plurality of nozzles, a pressure generating element disposed opposite to the nozzles and comprising a piezoelectric material and a conductive material, and an ink which fills in the periphery of the pressure generating element, wherein the pressure generating element is displaced by applying a voltage to discharge ink droplets from the nozzles.

Figure 23:
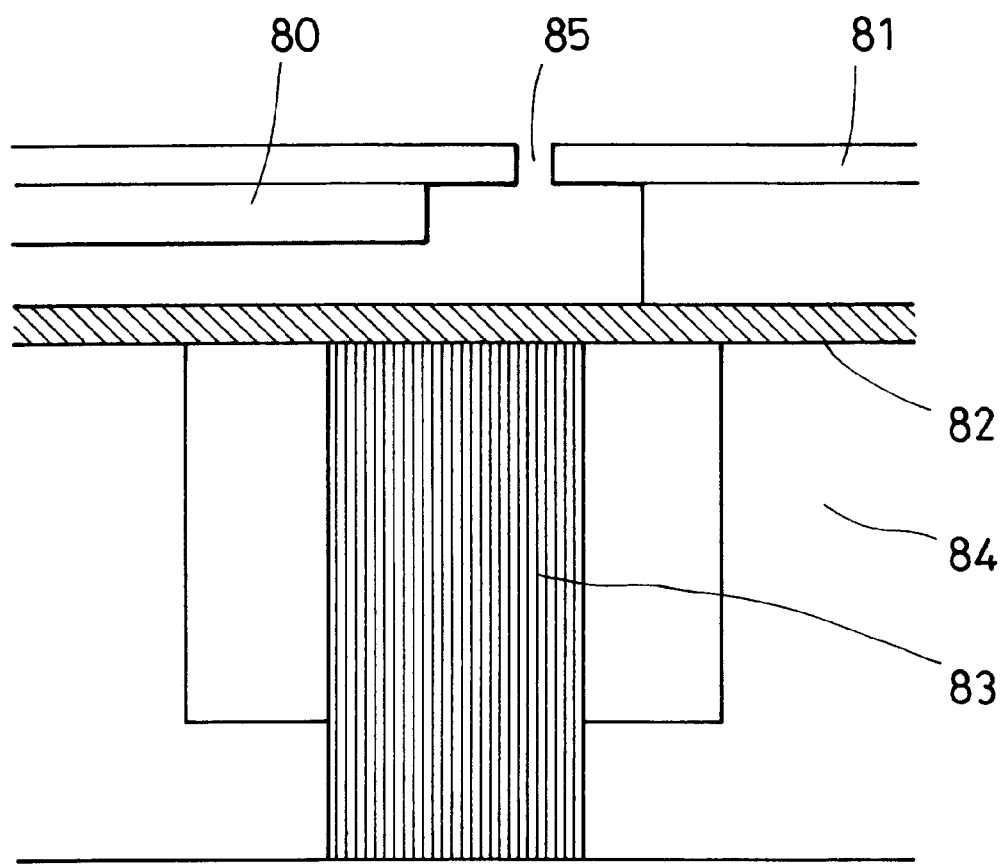
FIG. 23 is a schematic drawing showing another example of the construction of an ink jet recording head.

FIG. 23 shows an example of the construction of a recording head serving as a principal portion of the recording apparatus. In this example, the head comprises an ink passage 80 communicating with an ink chamber (not shown in the drawing), an orifice plate 81 for discharging a desired volume of ink droplets, a vibrating plate 82 for exerting pressure directly on the ink, a piezoelectric element 83 joined to the vibrating plate 82 to be displaced with an electric signal, and a substrate 84 for supporting and fixing the orifice plate 81, the vibrating plate 82, etc.

In FIG. 23, the ink passage 80 is made of a photosensitive resin or the like, the orifice plate 81 is formed by electrocasting stainless steel, nickel or the like, and has an orifice 85 formed by perforation by press work, the vibrating plate 82 comprises a metal film of stainless steel, nickel, titanium, or the like, or a highly elastic resin film or the like, and the piezoelectric element 83 comprises a dielectric material such as barium titanate, PZT (lead zirconate titanate; Pb[ZrTi]O$_2$), or the like.

In the recording head constructed as described above, when a pulsed voltage is applied to the piezoelectric element 83 to produce strain stress, the vibrating plate 82 joined to the piezoelectric element 83 is deformed by the energy of the strain stress to apply pressure to the ink in the ink passage 80 vertically so that ink droplets (not shown) are discharged from the orifice 85 of the orifice plate 81 to record an image.

Such a recording head is incorporated into the same king of recording apparatus as that shown in FIG. 4. The operations of the details of the recording apparatus are the same as described above.

Other examples of the recording apparatus and recording head which can be preferably used in the present invention will be described below.

Figure 7:
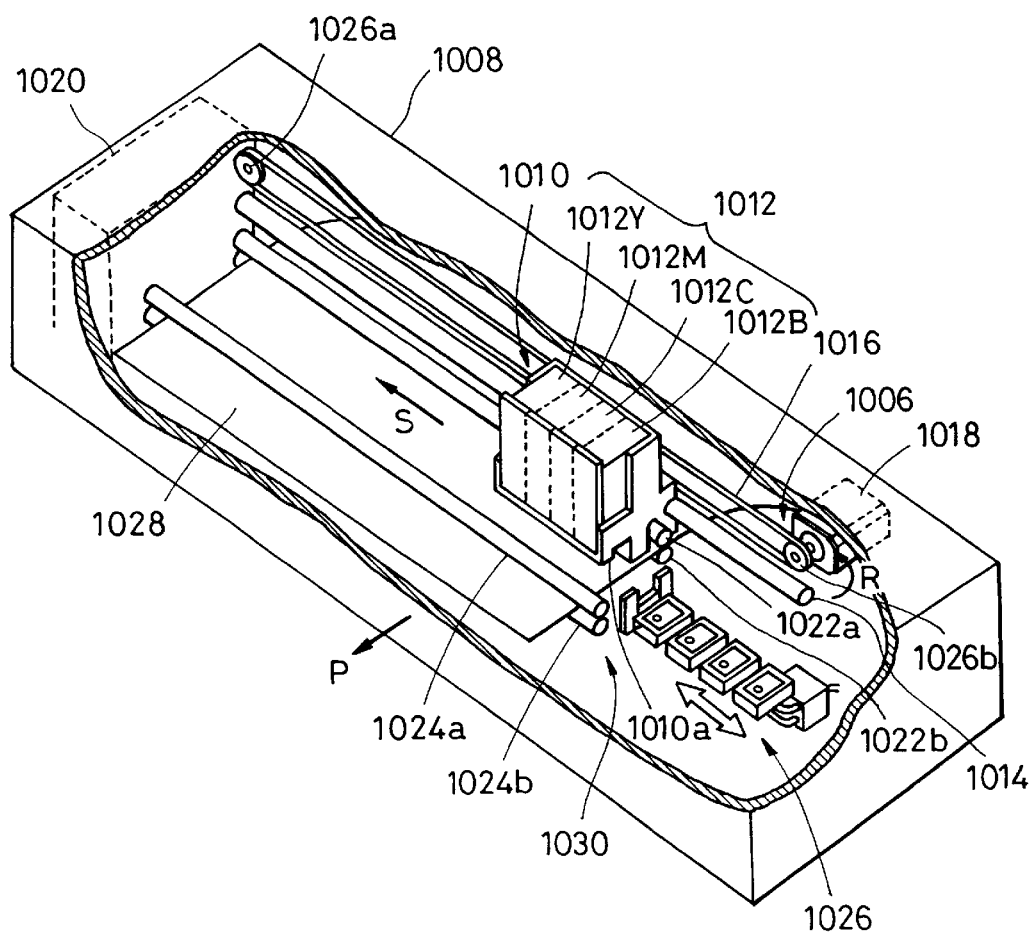
FIG. 7 is a schematic perspective view showing a principal portion of an example of an ink jet printer on which a liquid discharge head is mounted.

FIG. 7 is a schematic perspective view showing a principal portion of an example of an ink jet printer serving as a liquid discharge apparatus using a liquid discharge head on a discharge system in which during discharge, bubbles are communicated with the air. In FIG. 7, an ink jet printer comprises a transfer device 1030 for intermittently transferring, in the direction shown by an arrow P in FIG. 7, a sheet 1028 as a recording medium provided in a casing 1008 along the longitudinal direction thereof, a recording unit 1010 reciprocated along a guide shaft 1014 substantially in parallel to the direction S substantially perpendicular to the transfer direction P of the sheet 1028 transferred by the transfer device 1030, and a movement driving unit 1006 serving as driving means for reciprocating the recording unit 1010.

The transfer device 1030 comprises a pair of roller units 1022a and 1022b arranged opposite each other substantially in parallel, a pair of roller units 1024a and 1024b, and a driving unit 1020 for driving each of the roller units. Therefore, when the driving unit 1020 is put into an operating state, the sheet 1028 is intermittently transferred in the direction shown by the arrow P in FIG. 7 while being held between the roller units 1022a and 1022b and the roller units 1024a and 1024b.

The movement driving unit 1006 comprises a belt 1016 wound around pulleys 1026a and 1026b respectively provided on rotating shafts which are arranged opposite each other with a predetermined distance therebetween, and a motor 1018 arranged substantially in parallel with the roller units 1022a and 1022b to drive the belt 1016 connected to a carriage member 1010a of the recording unit 1010 in the forward and backward directions.

When the motor 1018 is put into an operating state to move the belt 1016 in the direction shown by the arrow R in FIG. 7, the carriage member 1010a of the recording unit 1010 is moved by a predetermined amount in the direction of the arrow S shown in FIG. 7. When the motor 1018 is put into an operating state to move the belt 1016 in the direction opposite to the direction shown by the arrow R in FIG. 7, the carriage member 1010a of the recording unit 1010 is moved by a predetermined amount in the direction opposite to the direction of the arrow S shown in FIG. 7. Furthermore, a recovery unit 1026 for recovering discharge of the recording unit 1010 is provided opposite to the ink orifice arrangement of the recording unit 1010 at the home position of the carriage member 1010a at an end of the movement driving unit 1006.

The recording unit 1010 comprises ink jet cartridges (may be referred to as "cartridge" 1012 hereinafter) 1012Y, 1012M, 1012C and 1012B which are detachably provided on the carriage member 1010a for colors, for example, yellow, magenta, cyan and black, respectively.

Figure 8:
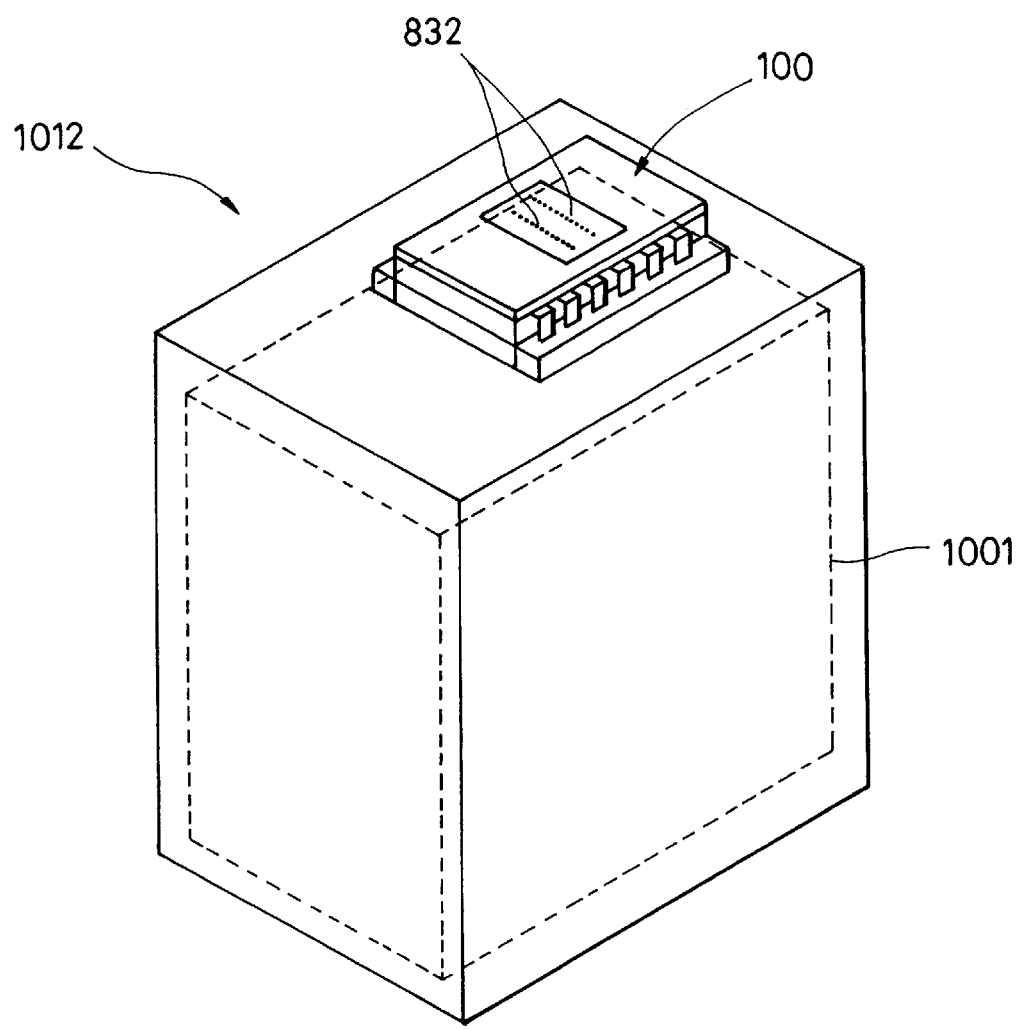
FIG. 8 is a schematic perspective view showing an example of an ink jet cartridge comprising a liquid discharge head.

FIG. 8 shows an example of an ink jet cartridge which can be mounted on the ink jet recording apparatus. In this example, a cartridge 1012 is of a serial type comprising a liquid discharge head 100, and a liquid tank 1001 containing a liquid such as ink or the like. The liquid discharge head 100 comprises many orifices 832 for discharging the liquid such as ink which is led to a common chamber (refer to FIG. 9) of the liquid discharge head 100 from the liquid tank 1001 through a liquid supply passage (not shown). The cartridge 1012 comprises the liquid discharge head 100 and the liquid tank 1001 which are integrally formed so that the liquid can be added to the liquid tank 1001as needed. However, the liquid tank 1001 may be detachably connected to the liquid discharge head 100.

An example of the liquid discharge head which can be mounted on the ink jet printer will be described in further detail below.

Figure 9:
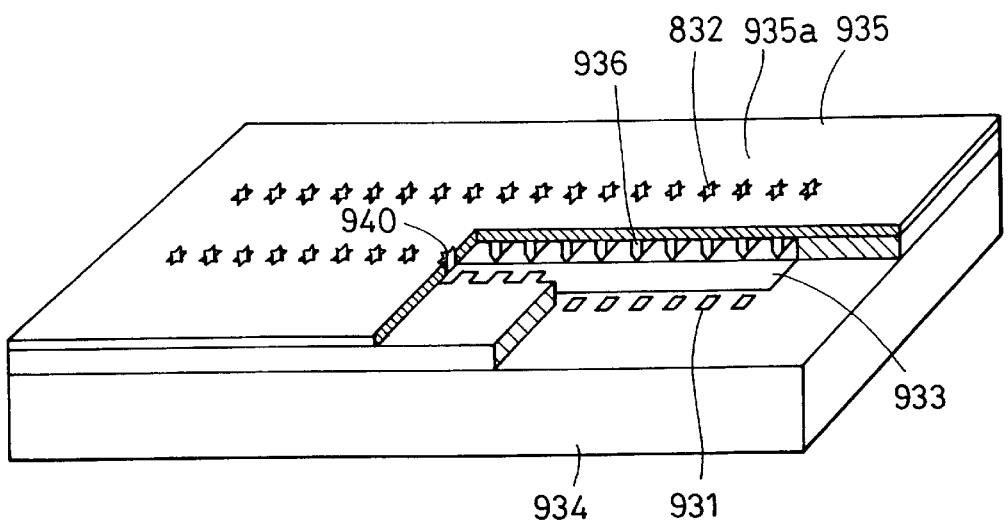
FIG. 9 is a schematic perspective view showing a principal portion of an example of a liquid discharge head.

FIG. 9 is a schematic perspective view showing a principal portion of a liquid discharge head in an embodiment of the present invention, and FIGS. 10 to 13 are front views showing the orifice shape of the liquid discharge head shown in FIG. 9. In these drawings, electrical wiring for driving an electrothermal conversion element, and the like are omitted.

The liquid discharge head of this example comprises a substrate 934 made of glass, ceramic, plastic, or a metal, for example, as shown in FIG. 9. The material of the substrate is not essential in the present invention, and not limited as long as it functions as a part of a passage component member and a support for an ink discharge energy generating element and a material layer which forms a liquid passage and orifice which will be described below. In this example, a Si substrate (wafer) is used. The orifice can be formed by a laser beam method or a method using an orifice plate 935 as a photosensitive resin described below and an exposure device such as an MPA (Mirror Projection Aligner).

In FIG. 9, reference numeral 934 denotes a substrate comprising an electrothermal conversion element (referred to as a "heater" hereinafter), and an ink supply port 933 comprising a slit-shaped through hole. In the substrate 934, the heaters 931 serving as heat energy generating means are arranged at intervals, for example, of 300 dpi, in a staggered form on both sides of the ink supply port 933 in the longitudinal direction. Furthermore, ink passage walls 936 are provided on the substrate 934, for forming ink passages. An orifice plate 935 having orifices 832 is further provided on the ink passage walls 936.

Although, in FIG. 9, the ink passage walls 936 and the orifice plate 935 are shown as separate members, the ink passage walls 936 can be formed on the substrate 934 by, for example, a spin coating method so that the ink passage walls 936 and the orifice plate 935 can be simultaneously formed as the same member. In this example, the orifice surface (upper surface) 935a is subjected to a water-repellent treatment.

In this example, a serial type head for recording an image while scanning in the direction of arrow S shown in FIG. 7 is used for recording with, for example, 1200 dpi. The driving frequency is 10 kHz, and ink is discharged from each orifice at minimum time intervals of 100 µs.

Figure 10:
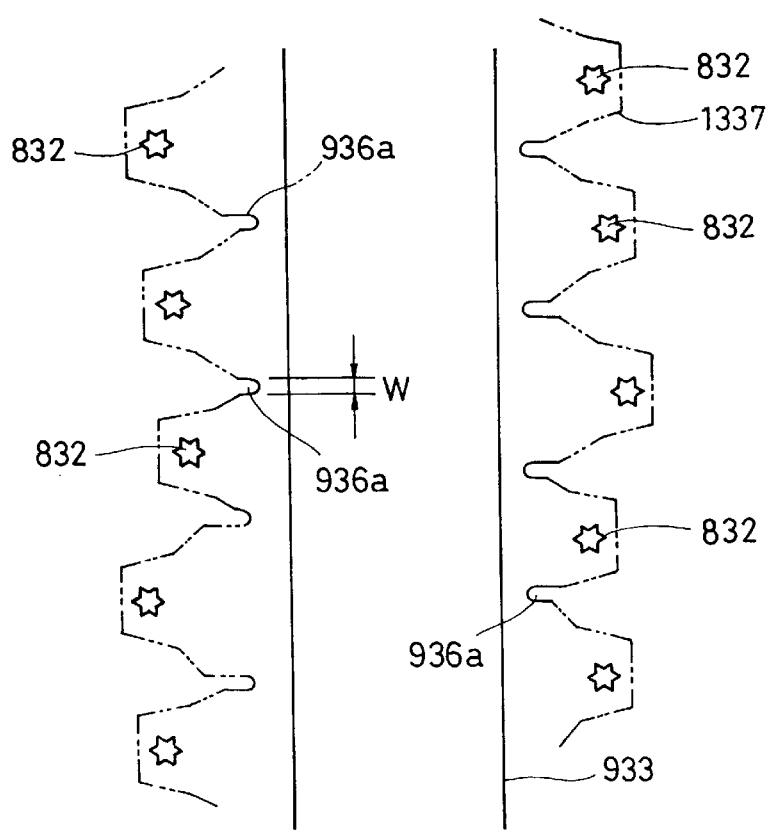
FIG. 10 is a conceptual drawing of a portion extracted from an example of a liquid discharge head.
Figure 13:
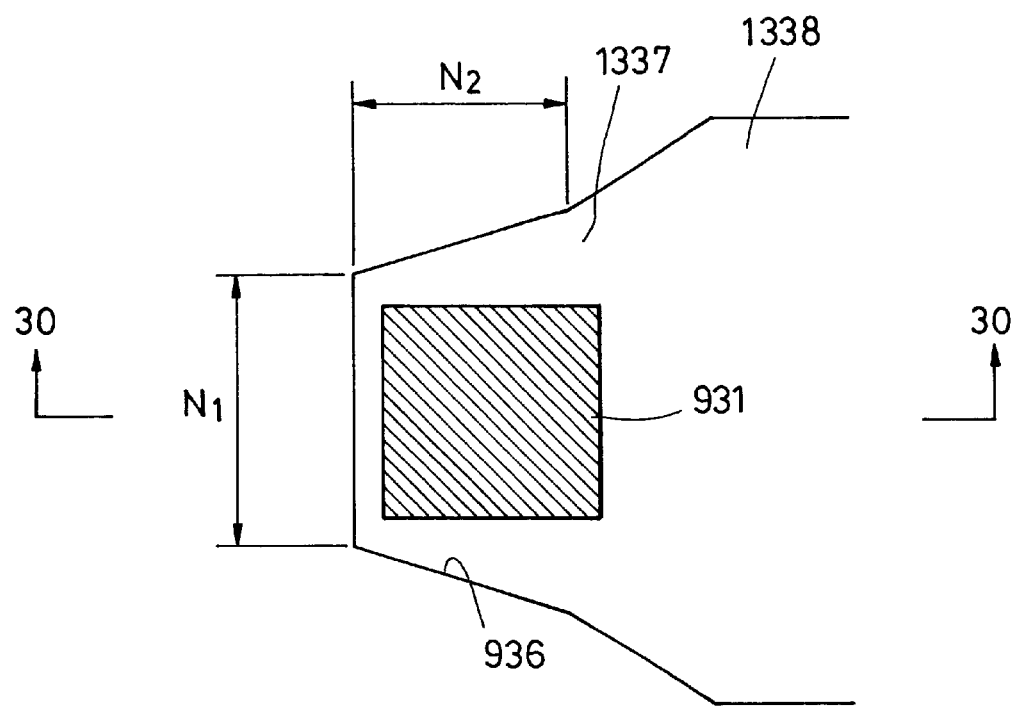
FIG. 13 is a schematic drawing showing a principal portion of the orifice portion shown in FIG. 10.

In an example of the head, for example, as shown in FIG. 10, each of the partitions 936a for isolating fluids ejected by adjacent nozzles from each other has a width w of 14 µm. As shown in FIG. 13, each liquid passage 1338 has a bubble chamber 1337 formed by the ink passage walls 936 and having $N_1$ (width dimension) of 33 µm, and $N_2$ (length dimension) of 35 µm. Each of the heaters 931 has a size of 30 µm×30 µm, a resistance value of 53 Ω, and a driving voltage of 10.3 V. Each of the ink passage walls 936 and the partitions 936a has a height of 12 µm, and the orifice plate has a thickness of 11 µm.

Figure 11:
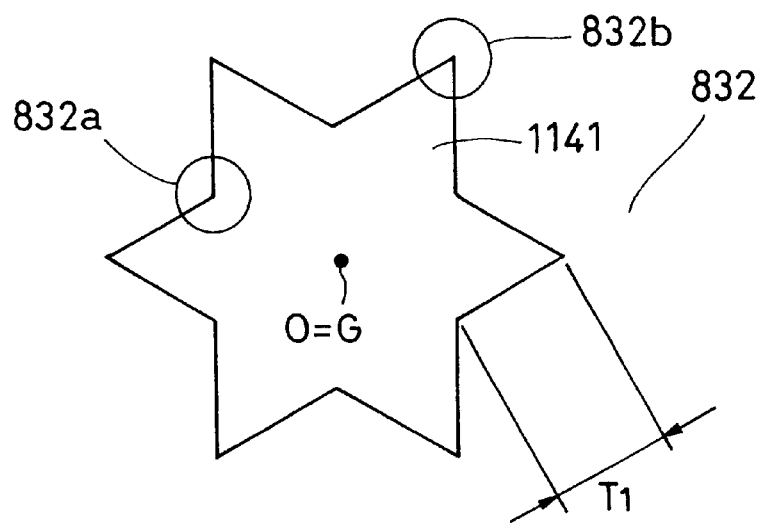
FIG. 11 is an enlarged drawing of the orifice shown in FIG. 10.

Each of the orifice portions 940 provided in the orifice plate having the orifices 832 has a substantially star-like section taken in the direction crossing the ink discharge direction (the thickness direction of the orifice plate 935). As shown in FIG. 11, the star-like section substantially comprises six protrusions 832a each having an obtuse angle, and six depressions 832b alternately disposed between the protrusions 832a and each having an acute angle. Namely, assuming that each of the depressions 832b which are located apart from the center O of each orifice is a top, and each of the protrusions 832a which are located near the center O of each orifice is a base, six grooves 1141 are formed in the thickness direction (the direction of liquid discharge) of the orifice plate shown in FIG. 9.

Figure 12:
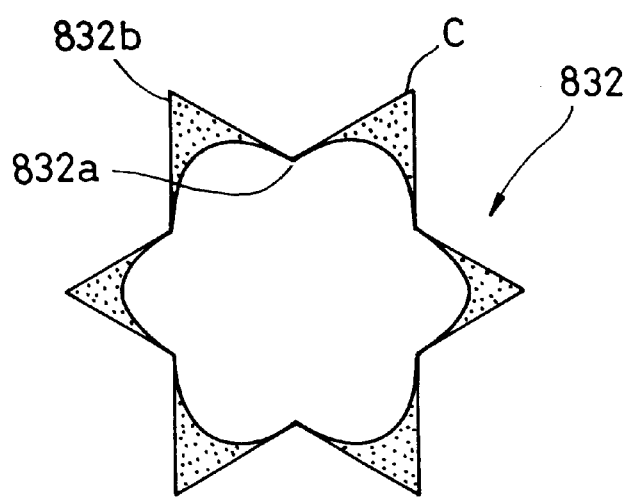
FIG. 12 is a schematic drawing showing a state in which an ink adheres to the orifice shown in FIG. 11.

In this example, each of the orifice portions 940 has a section taken in the direction crossing the thickness direction, in which an equilateral triangle having sides of 27 µm is laid over a similar triangle and rotated by an angle of 60 degrees, and the side $T_1$ shown in FIG. 11 is 8 µm. The angles of all protrusions 832a are 120 degrees, and the angles of all depressions 832b are 60 degrees. Therefore, the center O of each orifice coincides with the median point G of a polygon formed by connecting the centers of the adjacent grooves, i.e., the center of a figure formed by connecting the tops of the grooves and the two bases adjacent to the tops. In this example, each of the orifices 832 has an aperture area of 400 µm², and each of the grooves has an aperture area of about 33 µm² (the area of a figure formed by connecting the top of each groove and the two bases adjacent to the top). FIG. 12 is a schematic drawing showing the state in which ink (C) adheres to the orifice portion shown in FIG. 11.

Figure 14:
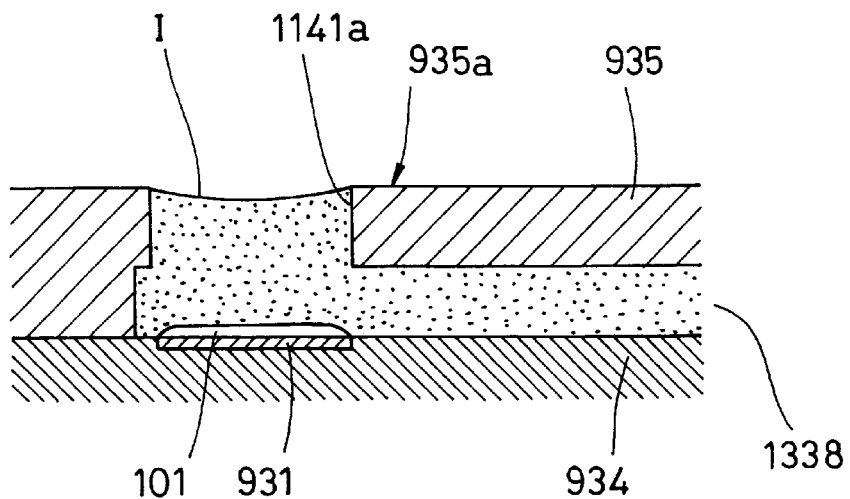
FIG. 14 is a schematic sectional view illustrating the liquid discharge operation of a liquid discharge head over time together with FIGS. 15 to 21 corresponding to the section taken along line 30—30 in FIG. 13.

The operation of discharging a liquid (I) by the ink jet recording head constructed as described above will be described below with reference to FIGS. 14 to 21. FIGS. 14 to 21 are sectional views of the bubble chamber 1337 taken along line 30-30 in FIG. 13, illustrating the liquid discharging operation of the liquid discharge head shown in FIGS. 9 to 13. In these sectional views, the end of each orifice portion 940 in the thickness direction of the orifice plate 935 is located at the top 1141a of each of the grooves 1141. FIG. 14 shows the state in which a film-like bubble is formed on a heater; FIGS. 15, 16, 17, 18, 19, 20, 21 and 22 show the states about 1 µs after, about 2 µs after, about 3 µs after, about 4 µs after, about 5 µs after, 6 µs after and about 7 µs after, respectively, the state shown in FIG. 14. In the description below, "falling" means movement toward the electrothermal conversion element regardless of the mounting direction of the head, not falling in the so-called called gravitional direction.

Figure 15:
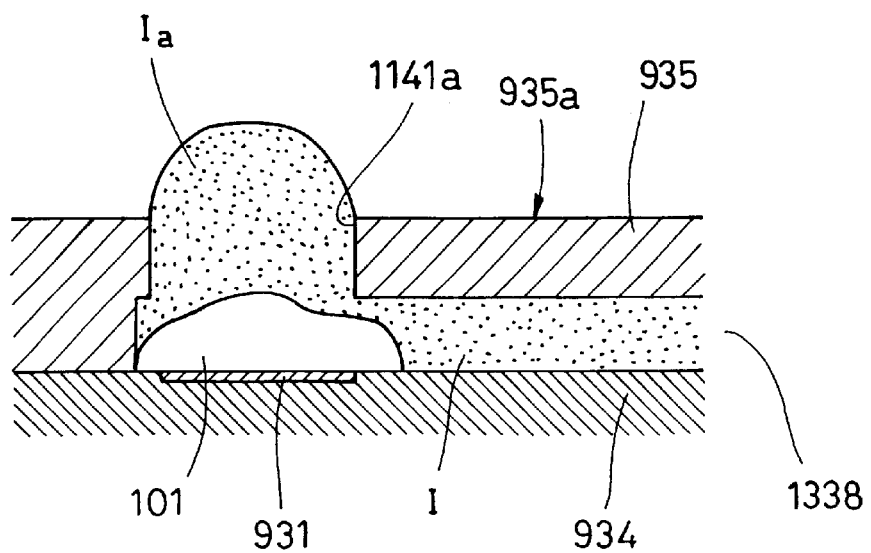
FIG. 15 is a schematic sectional view illustrating the liquid discharge operation of the liquid discharge head over time together with FIGS. 14 and 16 to 21 corresponding to the section taken along line 30—30 in FIG. 13.
Figure 16:
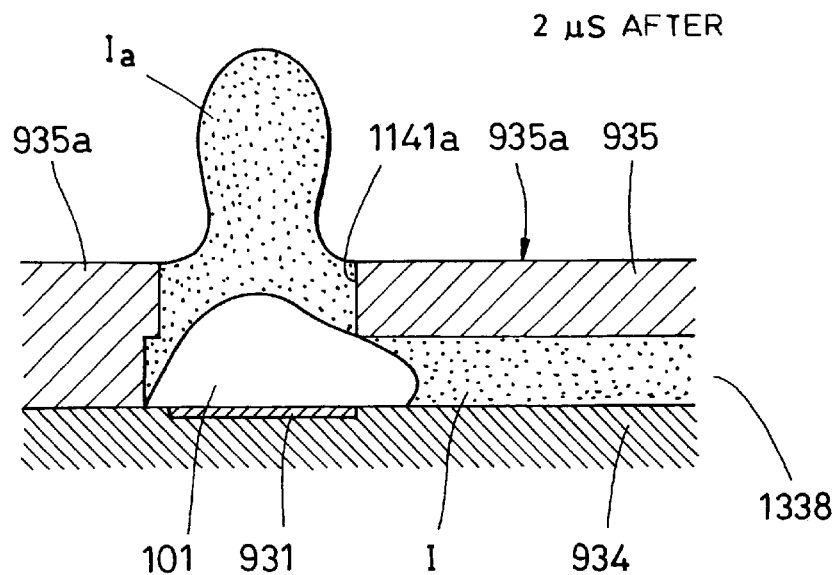
FIG. 16 is a schematic sectional view illustrating the liquid discharge operation of the liquid discharge head over time together with FIGS. 14, 15 and 17 to 21 corresponding to the section taken along line 30—30 in FIG. 13.
Figure 17:
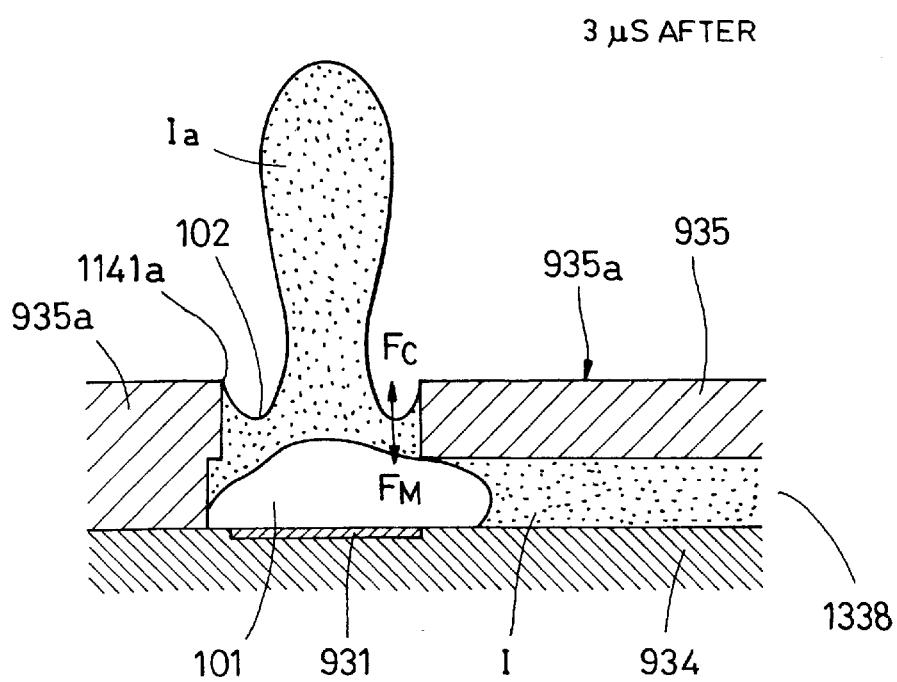
FIG. 17 is a schematic sectional view illustrating the liquid discharge operation of the liquid discharge head over time together with FIGS. 14 to 16 and 18 to 21 corresponding to the section taken along line 30—30 in FIG. 13.

As shown in FIG. 14, when a bubble 101 is produced in the liquid passage 1338 on the heater 931 with supply of electricity to the heater 931 based on a recording signal, the bubble 101 is abruptly grown due to volume expansion within about 2 $\mu$seconds, as shown in FIGS. 15 and 16. Although the height of the bubble 101 with the maximum volume exceeds the height of the orifice surface 935a, the pressure of the bubble is decreased to several to several tens of percent of the atmospheric pressure. Next, about 3 $\mu$seconds after the production of the bubble 101, the volume of the bubble 101 is decreased from the maximum, and at substantially the same time, formation of a meniscus 102 starts. The meniscus 102 also retracts toward the heater side, i.e., falls, as shown in FIG. 17. In this example, since a plurality of grooves 1141 (see FIG. 11) are dispersed in each orifice portion, capillary force is exerted in each of the grooves 1141 in the direction $F_C$ opposite to the retraction direction FM of the meniscus when the meniscus 102 retracts. As a result, even if slight variation is observed in the state of the bubble 101 due to some cause, the shapes of the meniscus and a main droplet (referred to as a "liquid or ink" hereinafter) $I_a$ at the time of retraction of the meniscus are corrected to a substantially symmetrical shape with respect to the orifice center.

Figure 18:
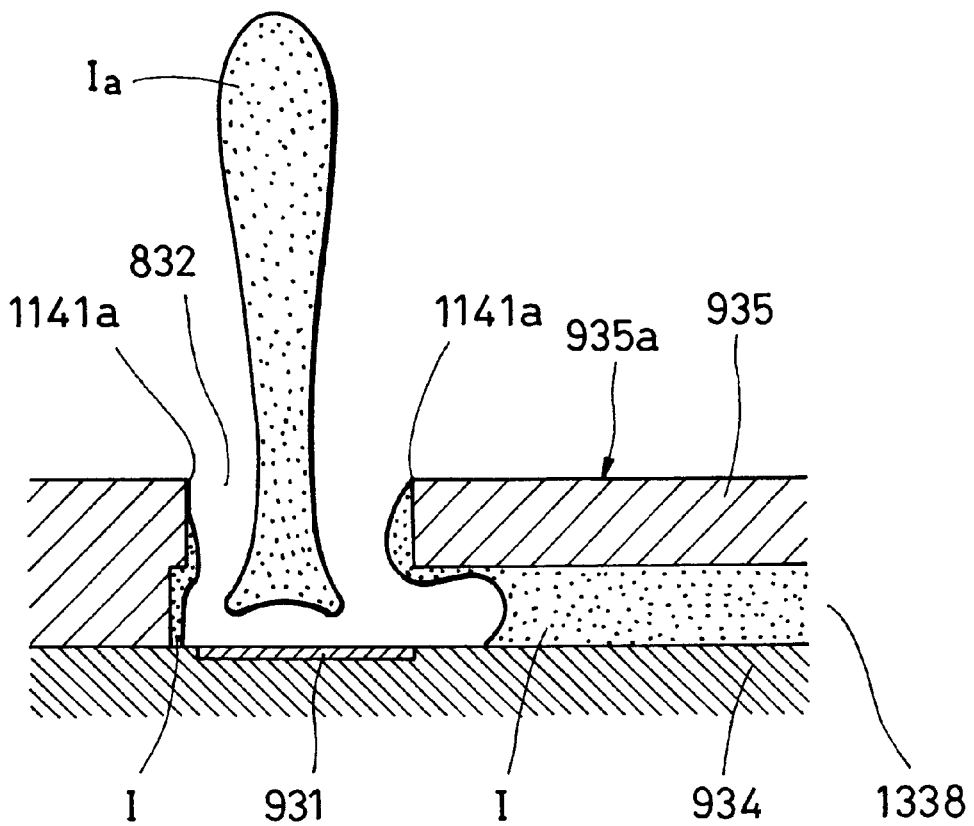
FIG. 18 is a schematic sectional view illustrating the liquid discharge operation of the liquid discharge head over time together with FIGS. 14 to 17 and 19 to 21 corresponding to the section taken along line 30—30 in FIG. 13.
Figure 19:
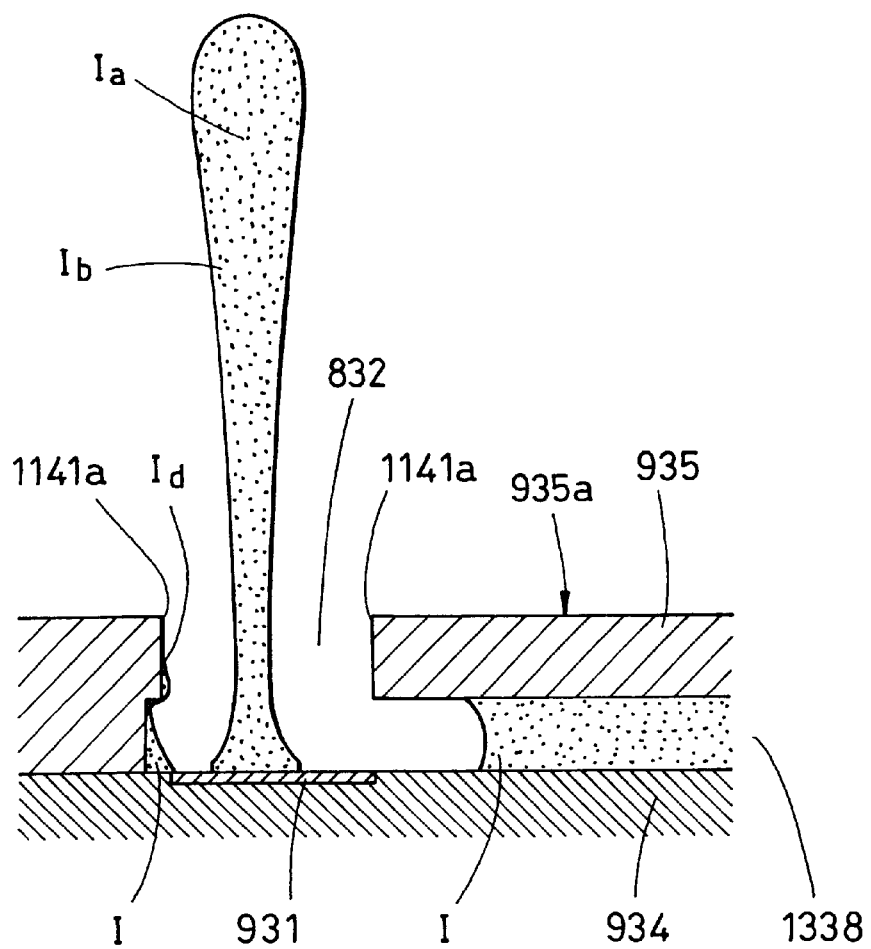
FIG. 19 is a schematic sectional view illustrating the liquid discharge operation of the liquid discharge head over time together with FIGS. 14 to 18, 20 and 21 corresponding to the section taken along line 30—30 in FIG. 13.
Figure 20:
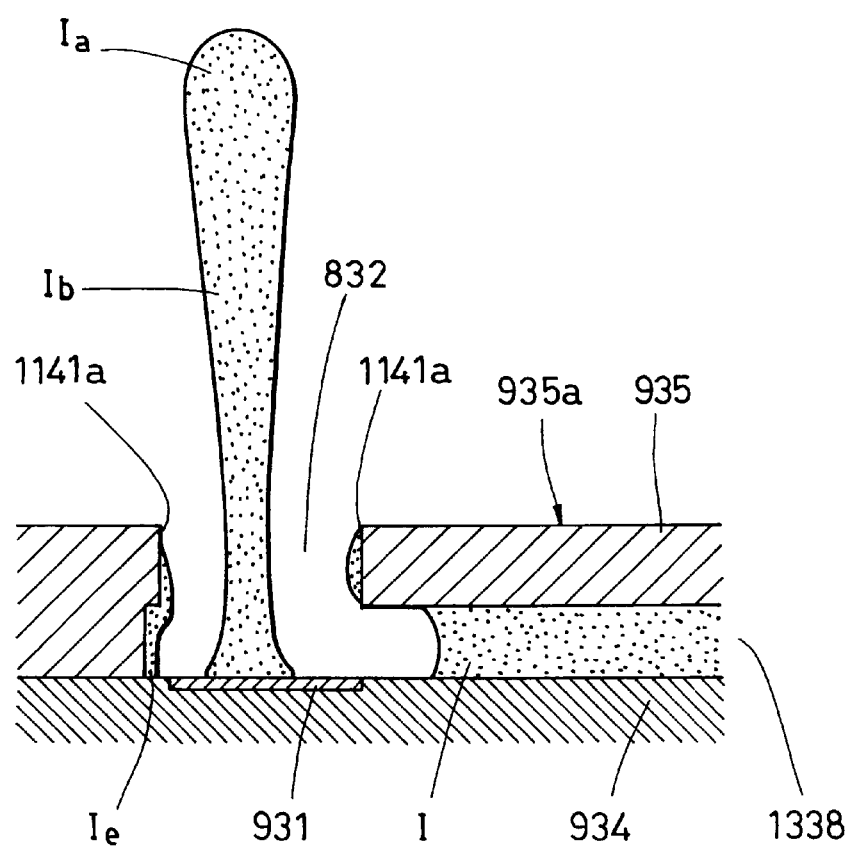
FIG. 20 is a schematic sectional view illustrating the liquid discharge operation of the liquid discharge head over time together with FIGS. 14 to 19 and 21 corresponding to the section taken along line 30—30 in FIG. 13.
Figure 21:
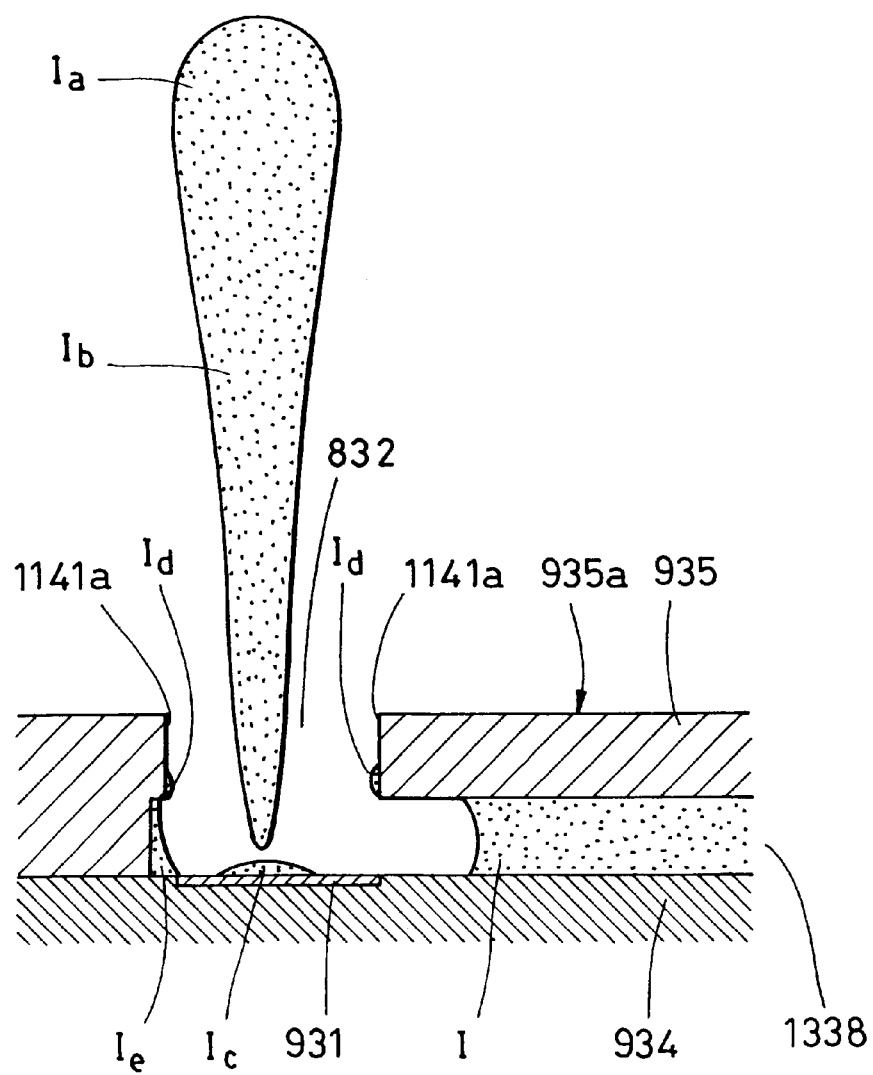
FIG. 21 is a schematic sectional view illustrating the liquid discharge operation of the liquid discharge head over time together with FIGS. 14 to 20 corresponding to the section taken along arrow line 30—30 in FIG. 13.

In this example, since the falling rate of the meniscus 102 is higher than the shrinkage rate of the bubble 101, about 4 $\mu$seconds after the formation of the bubble, the bubble 101 communicates with the air near the lower surface of the orifice 832, as shown in FIG. 18. At the same time, the liquid (ink) near the central axis of the orifice 832 falls toward the heater 931. This is due to the fact that the liquid (ink) $I_a$ retracted toward the heater side due to the negative pressure of the bubble 101 before communication with the air maintains its rate of falling to the heater side due to inertia after communication with the air. As shown in FIG. 19, about 5$\mu$ seconds after the production of the bubble 101, the liquid (ink) falling toward the heater side reaches the surface of the heater 931 and spreads to cover the surface of the heater 931 as shown in FIG. 20. Although the liquid spreading to cover the surface of the heater 931 has a horizontal vector along the surface of the heater 931, a vector in the direction crossing the surface of the heater 931, i.e., a vertical vector, disappears so that the liquid stays on the surface of the heater 931 to pull downward the upper portion of the liquid, i.e., the portion maintaining a rate vector in the discharge direction. Then, the liquid portion $I_b$ between the liquid portion spreading on the surface of the heater 931 and the upper portion (main droplet) is narrowed, and about 7 seconds after the formation of the bubble 101, the liquid portion $I_b$ is cut at the center of the surface of the heater 931 to be separated into the main droplet $I_a$ maintaining the rate vector in the discharge direction and the liquid portion $I_c$ spreading on the surface of the heater 931, as shown in FIG. 21. The separation position is preferably located in the liquid passage 1338, and more preferably located nearer to the electrothermal conversion element 931 than to the orifice 832. The main droplet $I_a$ has no deviation in the discharge direction, and is thus discharged from the central portion of the orifice 832 without deflection in discharge and adheres at the predetermined point of the recording surface of a recording medium. The liquid portion $I_c$ spreading on the surface of the heater 931 conventionally is ejected as a satellite droplet subsequent to the main droplet. However, in this example, the liquid portion $I_c$ stays on the surface of the heater 931 and is not discharged. In this way, the discharge of the satellite droplet can be suppressed to prevent the occurrence of spray which easily occurs due to discharge of the satellite droplet. Therefore, it is possible to securely prevent the recording surface of the recording medium from being stained with spray. In FIGS. 19 to 21, $I_d$ represents the ink (the ink in the grooves) adhering to the grooves, and $I_e$ represents the ink remaining in the liquid passage.

In the liquid discharge head of this example, when the liquid is discharged due to a decrease in volume after the volume of a bubble reaches the maximum, the discharge direction of main droplets can be stabilized by a plurality of grooves distributed around the center of each orifice. As a result, it is possible to provide a liquid discharge head causing no deviation in the discharge direction and having highly precise ejection. Also, even when variation occurs in bubbles at a high driving frequency, discharge can stably be performed, thereby realizing high-speed-high-definition printing.

Particularly, the bubble is communicated with the air due to a decrease in the volume of the bubble to discharge the liquid, thereby preventing the occurrence of spray when droplets are discharged due to communication between the bubble and the air. It is thus possible to prevent adhesion of droplets to the orifice surface, which suddenly causes so-called non-discharge.

Another example of the recording head of the discharge type in which bubbles are communicated with the air during discharge and which can be preferably used in the present invention is a so-called edge shooter type as disclosed in Japanese Patent Registration No. 2783647.

Particularly, the present invention exhibits an excellent effect in an ink jet recording head and recording apparatus in which ejected droplets are formed by utilizing heat energy.

The typical construction and principle of an ink jet recording system are disclosed, for example, in U.S. Pat. Nos. 4,723,129 and 4,740,796. This system can be applied to both of the on-demand type and the continuous type. In the on-demand type, at least one driving signal is applied to the electrothermal conversion elements, which are arranged opposite or a liquid passage containing the liquid (ink), to provide a rapid increase in temperature beyond nucleate boiling corresponding to recording information and generate heat energy in the electrothermal conversion elements, producing film boiling on the thermal action surface of the recording head. As a result, bubbles can be effectively produced in the liquid (ink) in one-to-one correspondence with driving signals. The liquid (ink) is discharged by growth and contraction of the bubbles through the orifice openings to form at least one droplet. When the driving signals are pulsed, the bubbles are appropriately immediately grown and contracted, and thus discharge of the liquid (ink) with excellent responsiveness can be preferably achieved.

As the pulsed driving signal, the signals disclosed in U.S. Pat. Nos. 4,463,359 and 4,345,262 are preferred. By using the conditions disclosed in U.S. Pat. No. 4,313,124 which relates to a rate of increase in temperature of a thermal action, excellent recording can be performed.

As the construction of the recording head, the present invention includes the construction disclosed in each of the above specifications in which an orifice, a liquid passage and an electrothermal conversion element are combined, and the constructions disclosed in U.S. Pat. Nos. 4,558,333 and 4,459,600 in which a thermal action surface is arranged in a curved portion.

The present invention is also effective in the construction disclosed in Japanese Patent Laid-Open No. 59-123670 in which a common slit is provided as an orifice portion for a plurality of electrothermal conversion elements, and the construction disclosed in Japanese Patent Laid-Open No. 59-138461 in which an aperture is provided corresponding to an orifice portion, for absorbing the pressure wave of heat energy.

As a full-line type recording head having a length corresponding to the maximum width of a recording medium on which a recording apparatus can record an image, either of a construction in which the length is obtained by a combination of a plurality of recording heads, as disclosed in each of the above specifications, and a construction comprising an integrally formed recording head can be used. However, in any case, the present invention can effectively exhibit the above effect.

The present invention is also effective with an exchangeable chip-type recording head which can be mounted to an apparatus body so as to enable electric connection with the apparatus body and supply of ink from the apparatus body, or a cartridge-type recording head comprising an ink tank provided integrally with the recording head.

Furthermore, recovery means, preliminary auxiliary means, etc. are preferably added as components of the recording head of the present invention because the effect of the present invention can be further stabilized. Examples of such means for stable recording include capping, cleaning means, pressure or suction means for the recording head, preliminary heating means comprising an electrothermal conversion element, another heating element, or a combination thereof, and a preliminary discharge mode for discharge other than recording discharge.

Furthermore, the present invention is effective with not only a recording apparatus in a recording mode using only a primary color such as black, but also an apparatus comprising an integrally formed recording head or a combination of a plurality of recording heads to perform multicolor recording using different colors or full-color recording using mixed colors.

Although, in the above-described embodiments of the present invention, the ink is used in a liquid state, examples of ink which can be used include an ink that is solid at room temperature or lower and softened or liquid at room temperature, and an ink which is liquid at the time of application of a recording signal in the above ink jet recording system because the temperature of the ink is generally controlled in the range of 30° C. to 70° C. so that the viscosity thereof is in the range of stable discharge.

Other examples of ink which can be used in the present invention include an ink in which an increase in temperature due to heat energy is positively used as energy for changing a solid state to a liquid state to prevent an increase in the temperature of the ink, and an ink which is allowed to stand to be solidified in order to prevent evaporation of the ink. In any case, the ink is liquefied by applying heat energy corresponding to a recording signal so that the ink is discharged in a liquid state and starts to be solidified when the ink reaches the recording medium. Namely, the ink is not liquefied until heat energy is applied. Such an ink may be held as a liquid or solid in recesses or through holes of a porous sheet arranged opposite to the electrothermal conversion elements, as disclosed in Japanese Patent Laid-Open Nos. 54-56847 and 60-71260. In the present invention, the above-described film boiling system is most effective for each of the inks.

In addition, the recording apparatus of the present invention may be used as an apparatus provided integrally or separately as an image output terminal of an information processing device such as a word processor, computer, or the like, a copying apparatus combined with a reader, or a facsimile having a transmitting-receiving function.

A liquid discharge apparatus on which the liquid discharge head is mounted will be schematically described below.

Figure 22:
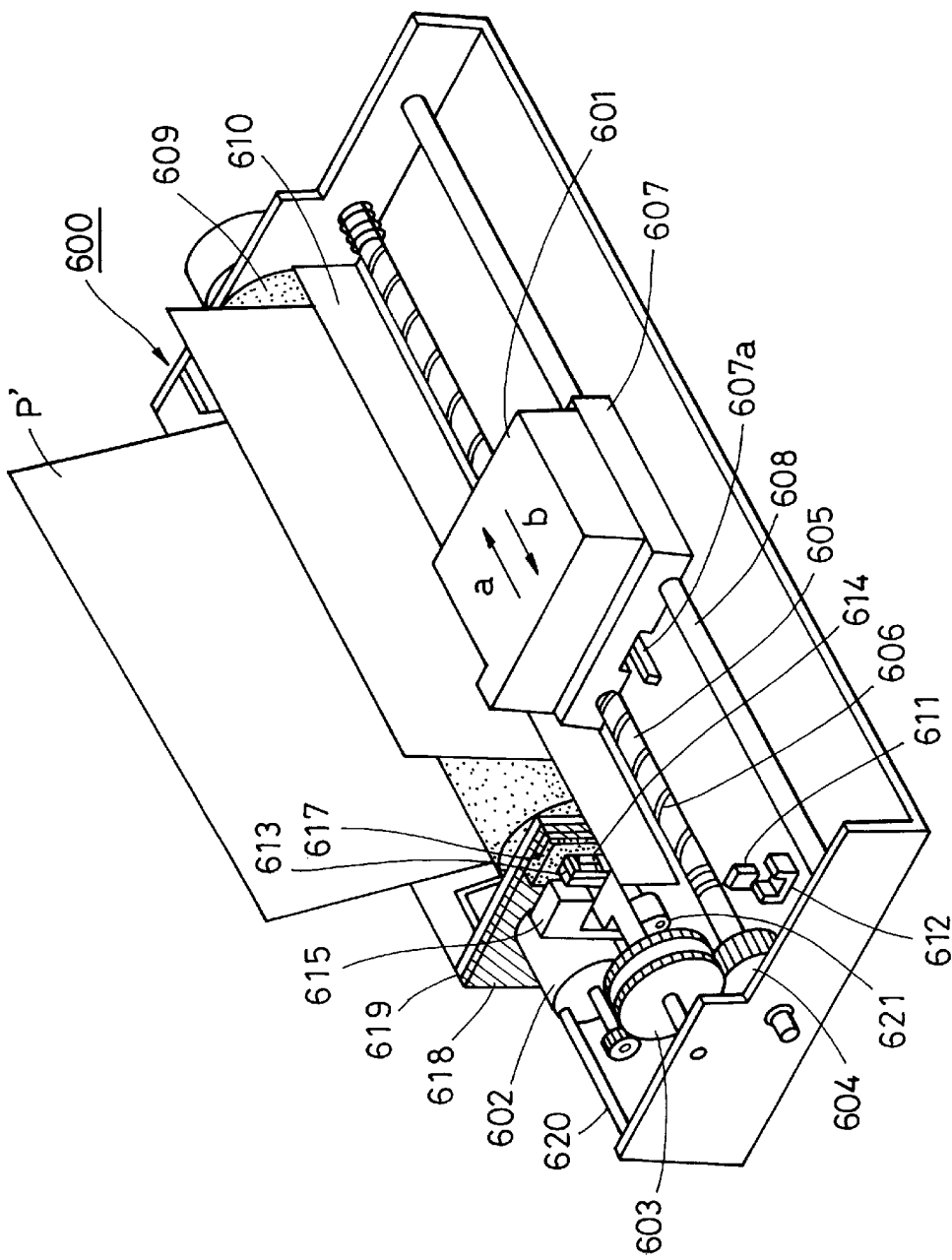
FIG. 22 is a drawing illustrating the construction of an ink jet recording apparatus to which the present invention can be applied.

FIG. 22 is a schematic perspective view of an ink jet recording apparatus 600 as an example of the liquid discharge apparatus on which the liquid discharge head of the present invention can be mounted. In FIG. 22, an ink jet head cartridge 601 comprises the liquid discharge head and an ink tank for holding ink to be supplied to the liquid discharge head, both of which are integrated. The ink jet head cartridge 601 is mounted on a carriage 607 engaged with a spiral groove 606 of a lead screw 605 which is rotated in linkage with forward-reversal rotation of a driving motor 602 through driving force transmission gears 603 and 604. Therefore, the ink jet head cartridge 601 is reciprocated together with the carriage 607 by motive power of the driving motor 602 in the directions of arrows a and b along a guide 608. A recording medium P' is transferred on a platen roller 609 by recording medium transfer means (not shown), and pressed on the platen roller 609 by a paper holding plate 610 in the movement direction of the carriage 607.

Furthermore, photocouplers 611 and 612 are provided near an end of the lead screw 605. These photocouplers 611 and 612 serve as home position detecting means for confirming the presence of a lever 607a of the carriage 607 in this area to change the rotational direction of the driving motor 602.

A support member 613 supports a capping member 614 for covering the front side (orifice surface) of the ink jet head cartridge 601 where orifices are present. Ink suction means 615 is adapted for suctioning the ink discharged from the ink jet head cartridge 601 and remaining in the capping member 614. The ink suction means 615 performs suction recovery of the ink jet head cartridge 601 through an opening (not shown) in the cap. A cleaning blade 617 for wiping the orifice surface of the ink jet head cartridge 601 is provided so that it can be moved by a moving member 618 in the forward-backward direction (the direction perpendicular to the movement direction of the carriage 607). The cleaning blade 617 and the moving member 618 are supported by a body support 619. The cleaning blade 617 is not limited to this form, and another known cleaning blade may be used.

In the operation of suction recovery of the liquid discharge head, a lever 620 for starting suction is moved with movement of a cam 621 engaged with the carriage 607, and driving force of the driving motor 602 is controlled by known transmission means such as a clutch or the like. Although an ink jet recording control unit is provided on the apparatus body, for applying a signal to a heating element provided on the liquid discharge head of the ink jet head cartridge 601 and controlling a drive of each of the mechanisms, the ink jet recording control unit is not shown in the drawings.

In the ink jet recording apparatus 600 having the above construction, recording is performed by reciprocation of the ink jet head cartridge 601 over the entire width of the recording material P' which is transferred on the platen roller 609 by the recording material transfer means not shown.

EXAMPLES

The present invention is described in further detail below with reference to Examples and Comparative Examples. The components of the ink are shown by "parts by weight" unless otherwise stated.

Formation of Ink

The components shown in the ink composition 1 below and each of the dyes (one or a combination of at least two) shown in Table 1 were prepared, and ion exchanged water was added to the components so that the total was 100 parts. The resultant mixture was filtered with a filter of 0.20 μm under pressure to form each ink.

| Ink composition 1 | |
|---|---|
| Glycerin | 5.0 parts |
| Urea | 5.0 parts |
| Diethylene glycol | 10.0 parts |
| Acetylenol EH (produced by Kawaken Fine Chemical Co., Ltd.) | 0.7 part |
| Ethanol | 5.0 parts |
| Colorant | Shown in Table 1 |
| Ion exchanged water | Balance (total 100 parts) |

Method of Forming Image Sample

Printing was performed by using the thus-formed ink and an on-demand ink jet printer as an ink jet recording apparatus using a heating element as an ink discharge energy source.

(1) Residual Ratio of Reflection Density, ΔE

The printer was filled with each of the inks C1 to Bk2 shown in Table 1, and a solid portion was printed by using each color with a reflection density of about 1.0. Then, the print was naturally dried for 24 hours, and then subjected to a fading test using a Xenon Fadometer Ci3000 (Atlas Corp.) through a glass cover. The illuminance was 63 klux, and the exposure time was 100 hours. All other conditions including lamp, filter, tank temperature, and humidity were set according to the conditions of ISO 10977 indoor sunlight fading through a window (tank temperature 25° C., relative humidity 55%). Although the illuminance on the basis of the ISO standards is 6 klux, the test was carried out with 63 klux for 100 hours because the test with 6000 klux·hr or more requires a long time. It was confirmed that reciprocity occurs with the same exposure.

The reflection density, and the color coordinates L*, a* and b* of the print were measured by a reflection density meter X-Rite 938 (trade name: produced by X-Rite Corp.) before and after the test to calculate the residual rate of reflection density and light fading ΔE according to the above-described equation 1. The results are shown in Table 1.

TABLE 1

| | C1 | C2 | C3 | C4 | LC1 | LC2 | M1 | M2 | M3 | M4 | LM1 | LM2 | Y1 | Y2 | Y3 | Y4 | LY1 | LY2 | Bk1 | Bk2 |
|---|---|---|---|---|---|---|---|---|---|---|---|---|---|---|---|---|---|---|---|---|
| C. I. Acid Blue 9 | 0.3 | 0.5 | | 1 | | 0.5 | | | | | | | | | | | | | | |
| C. I. Direct Blue 199 | 3.5 | | 4.5 | 1.65 | 1.5 | | | | | | | | | | | | | | | |
| C. I. Direct Blue 307 | | 3.5 | | | | | | | | | | | | | | | | | | |
| Compound Example I-2 | | | | | | | | | 3 | | | | | | | | | | | |
| Compound Example I-7 | | | | | | | | 3 | | | 1.8 | | | | | | | | | |
| Compound Example II-8 | | | | | | | 1 | | 3 | | | 0.9 | | | | | | | | |
| Compound Example III-21 | | | | | | | | 1 | | | | | | | | | | | | |
| C. I. Acid Red 289 | | | | | 0.1 | 0.1 | | | | | | | | | | | | | | |
| C. I. Acid Red 52 | | | | | | | | | | 0.8 | | | | | | | | | | |
| Magenta 377 | | | | | | | | | | 2.6 | | | | | | | | | | |
| C. I. Acid Yellow 23 | | | | | | | | | | | | | 2.5 | 1 | 1.6 | | 1 | | | |
| C. I. Direct Yellow 132 | | | | | | | | | | | | | 3 | | 2 | 1.5 | 1.2 | | | |
| C. I. FB2 | | | | | | | | | | | | | | | | | | | 2.2 | 4 |
| Compound Example 23 | | | | | | | | | | | | | | | | | | | 1.3 | |
| Compound Example 28 | | | | | | | | | | | | | | | | | | | 1 | |
| Residual rate of O.D. (%) | 92 | 91 | 98 | 67 | 92 | 4 | 91 | 85 | 85 | 78 | 95 | 80 | 96 | 65 | 85 | 82 | 96 | 62 | 90 | 70 |
| ΔE | 5 | 8 | 1 | 14 | 3 | 61 | 4 | 7 | 10 | 17 | 4 | 13 | 3 | 23 | 10 | 12 | 8 | 25 | 6 | 27 |

In the above Table 1, LC, LM and LY represent color inks of light cyan, light magenta and light yellow, respectively.

(2) Color Balance

An ink set comprising each of the predetermined ink combinations shown in Table 2 was prepared for the printer, and the ink container of the ink jet recording apparatus was filled with each of the inks of each ink set. Then, a full-color image was printed on glossy paper (PR-101; produced by Canon Inc.) with each of the inks. After printing, the print was naturally dried for 24 hours, and then subjected to the fading test. After the test, the color balance of the print was visually evaluated.

TABLE 2

| | Example | | | | Comparative Example | | | |
|---|---|---|---|---|---|---|---|---|
| | 1 | 2 | 3 | 4 | 1 | 2 | 3 | 4 |
| Dark C | C1 | C2 | C1 | C3 | C2 | C2 | C2 | C4 |
| Dark M | M1 | M2 | M1 | M1 | M2 | M1 | M3 | M4 |
| Dark Y | Y1 | Y1 | Y1 | Y1 | Y2 | Y1 | Y3 | Y4 |
| Dark Bk | | Bk1 | Bk1 | Bk1 | | Bk2 | Bk2 | |
| Light C | | | LC1 | LC1 | | | LC2 | |
| Light M | | | LM1 | LM1 | | | LM2 | |
| Light Y | | | LY1 | LY1 | | | LY2 | |

Evaluation Results

In Examples 1 to 4, the color balance was not lost after the fading test, and a clear image was maintained. In Comparative Example 1, the color balance was lost due to discoloration of the image with the yellow ink, and in Comparative Example 2, the color balance was lost due to discoloration of the image with the Bk ink. In Comparative Example 3, the portions using the light yellow and light cyan inks were significantly faded, and the black was changed color, thereby losing the color balance of the entire image and significantly deteriorating the image quality. In Comparative Example 4, the images with the cyan and magenta inks showed low residual rates of reflection density, and thus deterioration in image quality was observed over the entire image.

As described above, the present invention can provide an image which maintains good image quality without losing color balance even in long-term exposure.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set comprising at least three inks each containing a colorant and an aqueous medium, wherein in a fading test under conditions that cause fading corresponding to pseudo-indoor sunlight fading through a window for 3 years or more, respective images produced with the respective inks have the same $\Delta E$ or have difference in $\Delta E$ that are 10 or less in a CIELAB color space display system, and each of the respective images has a residual ratio of reflection density of 70% or more.

2. An ink set comprising at least two inks each containing a colorant and an aqueous medium, wherein in a fading test under conditions that cause fading corresponding to pseudo-indoor sunlight fading through a window for 3 years or more, respective images produced with the respective inks have the same $\Delta E$ or have a difference in $\Delta E$ that is 10 or less in a CIELAB color space display system, and each of the respective images has a residual ratio of reflection density of 80% or more.

3. An ink set according to claim 1 or 2, wherein in the fading test, light exposure is 6000 klux·hr or more.

4. An ink set according to claim 1 or 2, wherein the conditions in the fading test are set according to the ISO 10977 standards.

5. An ink set according to claim 1 or 2, wherein the images produced with the inks are formed on a recording medium comprising a substrate and a porous particle layer or a porous polymer layer formed on the substrate.

6. An ink set according to claim 1 or 2, wherein at least two of the inks have a same color tone, and different amounts of the colorant.

7. An ink set according to claim 1 or 2, wherein the inks include at least two color inks selected from the group consisting of yellow, magenta and cyan inks.

8. An ink set according to claim 7, wherein for at least one of the colors of inks, the ink comprises a first ink and a second ink having the same color tone, and wherein the second ink has a lower colorant content than the first ink.

9. An ink set according to claim 7, wherein the magenta ink comprises at least one dye represented by the following formula (I) as a colorant:

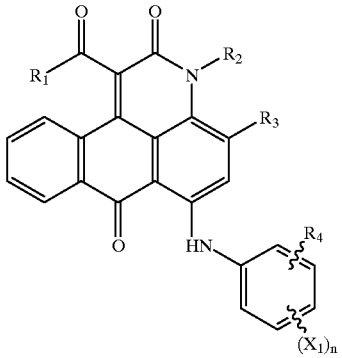

Formula (I)

wherein $R_1$ represents a substituted or unsubstituted alkoxy group, or a substituted or unsubstituted aryl group; $R_2$ and $R_4$ independently represent a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ represents a carboxyl group or a salt thereof, or a sulfonic acid group or a salt thereof; and n represents 1 or 2.

10. An ink set according to claim 9, wherein the magenta ink further comprises at least one dye selected from the group consisting of dyes represented by the following formulae (II), dyes represented by formula (III), and dyes having a xanthene structure as a colorant:

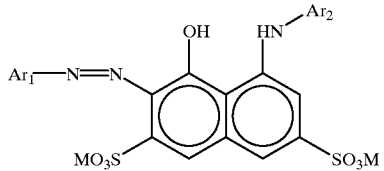

Formula (II)

wherein $Ar_1$ represents a substituted or unsubstituted phenyl group, or a substituted or unsubstituted naphthyl group; $Ar_2$ is selected from the group consisting of an acetyl group, a benzoyl group, a 1,3,5-triazinyl group, a $SO_2C_6H_5$ group and a $SO_2$—$C_6H_4$—$CH_3$ group; and M represents a counter ion of the sulfonic acid group selected from the group consisting of a hydrogen atom, an alkali metal, an ammonium and an organic ammonium;

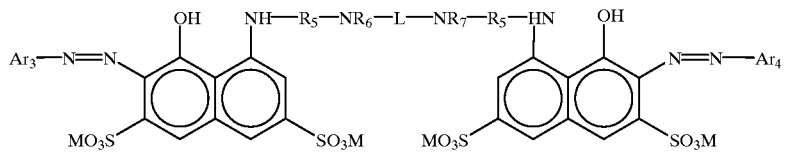

Formula (III)

wherein $Ar_3$ and $Ar_4$ independently represent a substituted or unsubstituted phenyl group, or a substituted or unsubstituted naphthyl group, at least one of $Ar_3$ and $Ar_4$ having as a substituent a carboxyl group or a salt thereof, or a sulfonic acid group or a salt thereof; M represents a counter ion of a sulfonic acid group selected from the group consisting of a hydrogen atom, an alkali metal, an ammonium and an organic ammonium; $R_5$ represents 1,3,5-triazinediyl group; each of $R_6$ and $R_7$ is independently selected from the group consisting of a hydrogen atom, a substituted or unsubstituted alkyl group, a substituted or unsubstituted alkenyl group, a substitute or unsubstituted aralkyl group, and an atomic group necessary for forming a perhydroxyazine ring together with N; and L represents a bivalent organic coupling group.

11. An ink set according to claim 7, wherein the cyan ink comprises at least one dye having a copper phthalocyanine structure as a colorant.

12. An ink set according to claim 11, wherein the dye having a copper phthalocyanine structure is Direct Blue 199.

13. An ink set according to claim 7, wherein the yellow ink comprises Direct Yellow 132 as a colorant.

14. An ink set according to claim 7, wherein the magenta ink comprises a dye represented by formula (I) and at least one dye selected from the group consisting of dyes represented by formula (II), dyes represented by formula (III), and a dye having a xanthene structure as a colorant, and wherein the cyan ink comprises Direct Blue 199 as a colorant, and the yellow ink comprises Direct Yellow 132 as a colorant.

15. An ink set according to claim 1 or 2, wherein each of the inks is used for ink jet recording.

16. An ink jet recording method comprising a step of discharging inks from orifices according to a recording signal to record an image on a recording medium, wherein the inks constitute an ink set according to claim 15.

17. An ink jet recording method according to claim 16, wherein the discharging step comprises the sub-step of applying thermal energy to the inks.

18. A recording unit comprising an ink container containing the respective inks constituting an ink set according to claim 15, and a head section for discharging the respective inks.

19. A recording unit according to claim 18, wherein the head section comprises a head for discharging the respective inks by applying thermal energy to the inks.

20. An ink cartridge comprising an ink container containing the respective inks constituting an ink set according to claim 1 or 2.

21. An ink jet recording apparatus comprising a recording unit comprising an ink container containing the respective inks constituting an ink set according to claim 15, and a head section for discharging the respective inks.

22. An ink jet recording apparatus according to claim 21, wherein the head section discharges the respective inks by applying thermal energy to the inks.

23. An ink jet recording apparatus comprising an ink cartridge provided with ink containers containing inks constituting the ink set according to claim 15, and a recording head for discharging the respective inks.

24. An ink jet recording apparatus according to claim 22, wherein the recording head discharges the respective inks by applying thermal energy to the inks.

\* \* \* \* \*

UNITED STATES PATENT AND TRADEMARK OFFICE
CERTIFICATE OF CORRECTION

PATENT NO. : 6,702,882 B2
DATED : March 9, 2004
INVENTOR(S) : Yuko Yakushigawa et al.

It is certified that error appears in the above-identified patent and that said Letters Patent is hereby corrected as shown below:

Column 7,
Line 7, "an d" should read -- and --.

Column 25,
Line 27, "1001*as*" should read -- 1001 *as* --.

Column 26,
Line 66, "so-called called" should read -- so-called -- and "gravitional" should read -- gravitational --.

Signed and Sealed this

Twentieth Day of July, 2004

JON W. DUDAS
*Acting Director of the United States Patent and Trademark Office*